US010409622B2

(12) United States Patent
Nair et al.

(10) Patent No.: US 10,409,622 B2
(45) Date of Patent: Sep. 10, 2019

(54) ORCHESTRATION PIPELINE FOR PROVIDING AND OPERATING SEGMENTED COMPUTING RESOURCES

(71) Applicant: Bank of America Corporation, Charlotte, NC (US)

(72) Inventors: Suresh G. Nair, Robbinsville, NJ (US); Hemanth G. Jayakumar, Plainsboro, NJ (US); Sundar Krishnamoorthy, East Windsor, NJ (US); Georges M. Nkamicaniye, Ewing, NJ (US)

(73) Assignee: Bank of America Corporation, Charlotte, NC (US)

( * ) Notice: Subject to any disclaimer, the term of this patent is extended or adjusted under 35 U.S.C. 154(b) by 129 days.

(21) Appl. No.: 15/232,942

(22) Filed: Aug. 10, 2016

(65) Prior Publication Data

US 2018/0048521 A1  Feb. 15, 2018

(51) Int. Cl.
*G06F 9/455* (2018.01)
*G06F 9/445* (2018.01)
(Continued)

(52) U.S. Cl.
CPC ............ *G06F 9/44589* (2013.01); *G06F 8/60* (2013.01); *G06F 8/61* (2013.01); *H04L 41/0816* (2013.01);
(Continued)

(58) Field of Classification Search
CPC .................................................. H04L 41/0806
See application file for complete search history.

(56) References Cited

U.S. PATENT DOCUMENTS 8,175,253 B2  5/2012 Knott et al.
9,064,224 B2  6/2015 Xiong et al.
(Continued)

OTHER PUBLICATIONS

"GNU make." Edition 0.74. May 21, 2016. Free Software Foundation, Inc. Retrieved from [https://www.gnu.org/software/make/manual/make.html] on May 26, 2016.
(Continued)

*Primary Examiner* — Blake J Rubin
*Assistant Examiner* — Sm Z Islam
(74) *Attorney, Agent, or Firm* — Banner & Witcoff, Ltd.; Michael A. Springs

(57) ABSTRACT

Aspects of the disclosure are directed to utilizing a computing platform definition to operate an orchestration pipeline for a computing platform conforming to that computing platform definition. The computing platform definition may indicate the devices and the executables to be deployed to the computing platform. The orchestration pipeline may include multiple stages such as a build stage that builds the executables, a deploy stage that deploys the executables, a test stage that initiates execution of test cases, an scan stage that applies code standards to the source code of the executables, and an enforce stage that determines an extent to which the computing platform deviates from the computing platform definition. Performing a stage of the orchestration pipeline may include detecting a trigger for the stage, retrieving entries associated with the stage from the computing platform definition, and controlling execution of the stage based on the entries retrieved.

20 Claims, 12 Drawing Sheets

(51) Int. Cl.
*G06F 8/60* (2018.01)
*H04L 12/24* (2006.01)
*H04L 12/26* (2006.01)
*G06F 8/61* (2018.01)

(52) U.S. Cl.
CPC .......... *H04L 41/0896* (2013.01); *H04L 41/22* (2013.01); *H04L 43/045* (2013.01)

(56) References Cited

U.S. PATENT DOCUMENTS

| | | | |
|---|---|---|---|
| 9,075,959 | B2 | 7/2015 | Chouinard et al. |
| 9,098,364 | B2 | 8/2015 | Davis |
| 9,158,522 | B2 | 10/2015 | Nyisztor et al. |
| 9,454,294 | B2 | 9/2016 | Sapuram et al. |
| 9,491,588 | B1 * | 11/2016 | Biehl .................... H04W 4/043 |
| 9,563,480 | B2 | 2/2017 | Messerli et al. |
| 9,632,770 | B2 | 4/2017 | Harrison et al. |
| 9,710,365 | B2 | 7/2017 | Correll |
| 9,740,473 | B2 | 8/2017 | Kumar et al. |
| 9,824,390 | B2 | 11/2017 | Adapalli et al. |
| 9,990,426 | B2 | 6/2018 | Micucci et al. |
| 2002/0178262 | A1 | 11/2002 | Bonnell et al. |
| 2007/0143035 | A1 * | 6/2007 | Petruno ............ G01N 35/00594 702/27 |
| 2009/0248586 | A1 | 10/2009 | Kaisermayr et al. |
| 2010/0281458 | A1 * | 11/2010 | Paladino .................... G06F 8/71 717/106 |
| 2011/0167141 | A1 | 7/2011 | Bush et al. |
| 2011/0231832 | A1 | 9/2011 | Dorn et al. |
| 2012/0124294 | A1 * | 5/2012 | Atkisson ............... G06F 11/108 711/135 |
| 2012/0272204 | A1 | 10/2012 | Olewski et al. |
| 2013/0030962 | A1 | 1/2013 | Erle et al. |
| 2013/0073724 | A1 * | 3/2013 | Parashar ............... G06F 9/5038 709/224 |
| 2013/0174124 | A1 | 7/2013 | Watters et al. |
| 2014/0035945 | A1 | 2/2014 | Anglin et al. |
| 2014/0040343 | A1 | 2/2014 | Nickolov et al. |
| 2014/0279201 | A1 | 9/2014 | Iyoob et al. |
| 2014/0372985 | A1 | 12/2014 | Levin et al. |
| 2015/0074659 | A1 | 3/2015 | Madsen et al. |
| 2015/0180734 | A1 | 6/2015 | Maes et al. |
| 2015/0244597 | A1 | 8/2015 | Maes et al. |
| 2015/0296030 | A1 | 10/2015 | Maes et al. |
| 2015/0350021 | A1 * | 12/2015 | Morris ................ H04L 41/0816 709/224 |
| 2016/0087933 | A1 | 3/2016 | Johnson et al. |
| 2017/0026488 | A1 | 1/2017 | Hao et al. |

OTHER PUBLICATIONS

Dec. 18, 2018—(US) Notice of Allowance—U.S. Appl. No. 15/918,040.
Elmangoush et al., "Towards Standard M2M PIAs for Cloud-based Telco Service Platforms", 8 pages (Year: 2013).
Hossny et al., "Semantic-based generation of generic-API adapters for portable cloud applications", 5 pages (Year: 2016).
Park, et al., "Platform-Aware Dynamic Configuration Support for Efficient Text Processing on Heterogeneous System," Mar. 2015, 6 pages.
Galluppi et al., "A Hierachical Configuration System for a Massively Parallel Neural Hardware Platform," May 2012, 10 pages.
Elmangoush et al., "Towards Standard M2M APIs for Cloud-Based Telco Service Platforms," Dec. 2013, 8 pages.
Sep. 4, 2018—(US) Ex Parte Quayle Office Action—U.S. Appl. No. 15/918,040.
May 16, 2018—(US) Non-Final Office Action—U.S. Appl. No. 15/232,886.
Sep. 22, 2017—(US) Notice of Allowance—U.S. Appl. No. 14/558,317.
Aug. 28, 2017—(US) Non-Final Office Action—U.S. Appl. No. 15/233,056.
Jan. 26, 2018—(US) Notice of Allowance—U.S. Appl. No. 15/233,056.
Mar. 28, 2016—(US) Notice of Allowance—U.S. Appl. No. 15/798,548.

* cited by examiner

ORCHESTRATION PIPELINE FOR PROVIDING AND OPERATING SEGMENTED COMPUTING RESOURCES

CROSS-REFERENCE TO RELATED APPLICATIONS

This application is related to U.S. patent application Ser. No. 14/558,317 entitled "Distributed Computing System" and filed on Dec. 2, 2014 which published as U.S. Pat. App. Pub. No. 2016/0087844 on Mar. 24, 2016, and which claims the benefit of U.S. Provisional Pat. App. No. 62/052,185 entitled "Business Platform as a Service" and filed on Sep. 18, 2014, each of which is incorporated by reference herein in their entirety.

This application is also related to U.S. patent application Ser. No. 15/232,886 entitled "Using Computing Platform Definitions to Provide Segmented Computing Platforms in a Computing System" concurrently filed with U.S. patent application Ser. No. 15/233,056 entitled "Application Programming Interface for Providing Access to Computing Platform Definitions", each of which is also incorporated by reference herein.

TECHNICAL FIELD

The present application is generally directed to computer networks and digital processing systems for multi-computer data transferring. The present application is particularly directed to network computer configuring that includes assigning operating characteristics to computing devices of a computing system and initializing those computing devices to establish their functional configuration.

BACKGROUND

Equipping an organization with the computing infrastructure necessary to carry out its mission becomes more challenging as the organization increases in size and complexity. Such challenges include identifying the computing resources needed to support the functions of various aspects of the organization (e.g., departments, divisions, business channels), determining whether those needs overlap, and determining where those needs diverge. A computing infrastructure that provides inadequate computing resources may prevent the organization from functioning effectively or efficiently. On the other hand, a computing infrastructure that goes beyond the needs of the organization may result in wasted resources, e.g., from unnecessary redundancies. Accordingly, when establishing a computing infrastructure for an organization, one goal is to provide a computing infrastructure that strikes a balance between meeting the needs of the organization, accommodating changes to those needs (e.g., growth), and avoiding wasted resources.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the present disclosure are directed to systems, methods, devices, apparatuses, and non-transitory computer-readable media having instructions stored thereon for operating an orchestration pipeline for a computing platform implemented according to a computing platform definition.

According to some aspects, a computing platform definition includes entries that indicate the devices and executables to be deployed to a computing platform. The entries may also include build dependency entries that indicate dependencies to build when building the executables of the computing platform. The computing platform definition may also indicate a deployment sequence specifying the order in which the executables of the computing platform should be deployed to the respective devices of the computing platform.

According to additional aspects, the entries of a computing platform may also include additional types of entries. For example, some entries may indicate test cases to perform at the computing platform and entries that indicate the test data to use when performing those test cases. Test cases may be automatically executed at the computing platform according to the test case entries and test data entries of its corresponding computing platform definition. As another example, some entries indicate code standards that the source code of the executables of a computing platform must satisfy. The source code of the executables of a computing platform may thus be automatically evaluated according to the code standard entries of its corresponding computing platform definition. As a further example, some entries indicate enforcement standards that a computing platform must satisfy. The enforcement standards may indicate if and the extent to which an instance of a computing platform is permitted to deviate from its corresponding computing platform definition. An instance of a computing platform may thus be evaluated according to the enforcement standards, e.g., by comparing the devices and executables actually deployed at the computing platform to the device entries and executable entries of its corresponding computing platform definition. If an instance of a computing platform definition deviates too far from its corresponding computing platform definition, notifications may be provided.

According to further aspects, an orchestration pipeline may include multiple stages to perform with respect to a computing platform. The stages of the orchestration pipeline may include, for example, a build stage that builds the executables of the computing platform, a deploy stage that deploys the executables to the computing platform, a test stage that initiates execution of test cases at the computing platform, an scan stage that applies code standards to the source code of the executables of the computing platform, and an enforce stage that determines an extent to which the computing platform deviates from the computing platform definition. Performing a stage of the orchestration pipeline may include detecting a trigger for the stage, retrieving entries associated with the stage from the computing platform definition, and controlling execution of the stage based on the entries retrieved.

Performing the build stage, for example, may include retrieving the set of executable entries and the set of build dependency entries from the computing platform definition, initiating a build of an executable according to its corresponding executable entry, and initiating a build of a dependency according to its corresponding build dependency entry. A trigger for the build stage may be a commit of the source code associated with one of the executables. Performing the deploy stage may include retrieving a deployment sequence from the computing platform definition that indicates an order in which to deploy the executables and deploying the executables to the computing platform according to the deployment sequence. A trigger for the deploy stage may be the successful build of one or more executables of the computing platform. Performing the test stage may include retrieving test cases entries and test data entries from the computing platform definition and initiating performance of those test cases at the computing platform using the test data indicated. A trigger for the test stage may be the successful deployment of one or more of the executables. Performing the scan stage may include retrieving code standard entries from the computing platform definition and applying the code standards indicated to the source code of the executables of the computing platform. Performing the scan stage may include retrieving enforcement standard entries from the computing platform definition and applying the enforcement standards indicated to the computing platform in order to determine the extent to which the computing platform deviates from its corresponding computing platform definition.

Additional aspects of the present disclosure will be apparent in view of the detailed description provided below.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Figure 1:
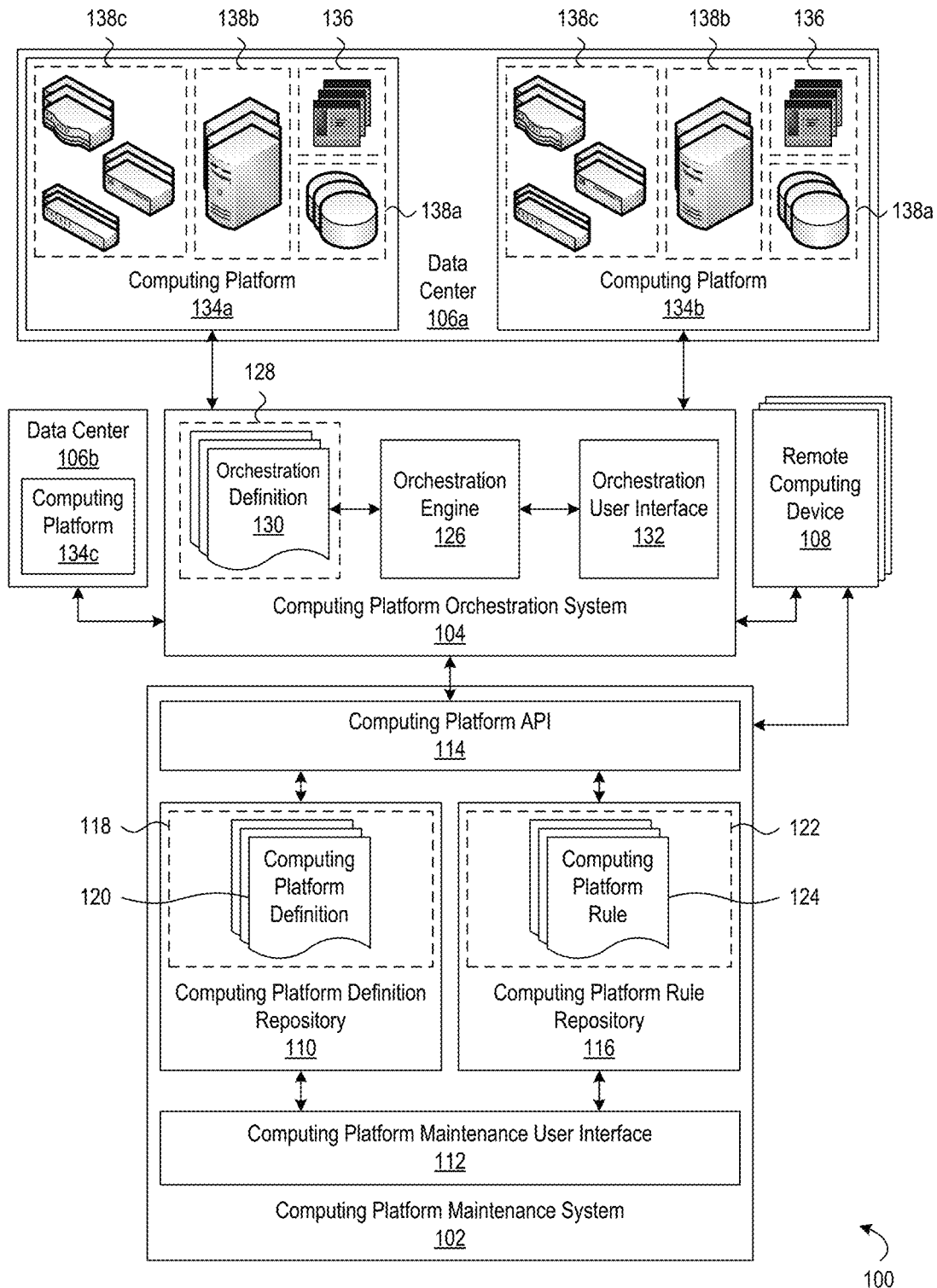
FIG. 1 is a block diagram of an example of an implementation of a computing system having multiple segmented computing platforms that are managed by a computing platform orchestration system and a computing platform maintenance system.

To address the challenges discussed above, techniques are described below for utilizing computing platform definitions in order to implement various computing platforms of a computing system. As will be appreciated upon review of the disclosures provided in further detail below, the techniques described herein advantageously facilitate the configuration, deployment, maintenance, and modification of the computing platforms of a computing system.

As a general introduction to the disclosures below, a computing platform definition may be employed to establish a computing infrastructure of an organization. A computing platform definition may indicate sets of configurable elements that can be deployed, installed, instantiated, or otherwise set up at a data center. The sets of configurable elements include sets of hardware devices as well as sets of executables to run at the hardware devices. The computing platform definition may also indicate various specifications for the configurable elements (e.g., device specifications, configuration settings). A computing platform definition may indicate additional information associated with a computing platform which will be discussed in further detail below.

An orchestration engine may utilize the computing platform definition to implement a corresponding computing platform at a data center. The orchestration engine may operate to read the computing platform definition in order to identify the devices and executables necessary to implement the computing platform, build the necessary executables, and deploy those executables to the appropriate devices that have been set up at the data center. Accordingly, the computing platform definition may be understood as the logical embodiment of a computing platform while the collection of devices and executables set up at a data center may be understood as the physical embodiment of that computing platform. In turn, a computing platform may be described as implementing a computing platform definition when the sets of configurable elements (e.g., devices, executables) indicated in the computing platform definition have been set up at a data center. In addition, a data center may be described as implementing a particular computing platform when the data center provides a computing platform that implements a computing platform definition.

A data center may implement one or more computing platforms. For example, a data center may implement multiple instances of the same computing platform. In this example, the same computing platform definition may be utilized to implement each instance of the computing platform at the data center. In another example, a data center may implement different computing platforms. In this other example, different computing platform definitions may be utilized to implement the respective computing platforms at the data center. Similarly, multiple data centers may implement individual instances of a computing platform using the same computing platform definition. Data centers may thus be geographically distanced from each other (e.g., a "west coast data center" and an "east coast data center") but implement common computing platforms.

Computing administrators may create the computing platform definitions a priori before establishing a data center or a posteriori as an effort to overhaul an existing data center. Accordingly, the creation of an a priori computing platform definition may involve an assessment of the anticipated needs of an organization (e.g., a particular business channel) that the computing platform is intended to support. For example, an administrative team may identify the executables users will need to access and the corresponding devices necessary to run those executables. The administrative team may then create and configure a computing platform that indicates the executables and devices identified as well as, e.g., any corresponding specifications and configuration settings. Having identified the devices necessary to implement the computing platform, the administrative team may set up the necessary devices at a data center. The orchestration engine may then automate deployment of the corresponding executables identified in the computing platform definition to the devices set up at the data center in accordance with the specifications in the computing platform definition. As described in further detail below, the orchestration engine may also automate maintenance and testing of the computing platform in accordance with the computing platform definition.

As another example, existing computing systems may be evaluated for opportunities to overhaul existing computing resources. This evaluation process may include taking inventory of the devices and executables currently utilized by an organization (e.g., various business channels) at its existing data centers. An administrative team may then review the device and executable inventories, e.g., to identify devices and executables that are redundant, idle, overworked, and the like. The administrative team may, for example, discover that two separate business channels each utilize a common set of executables that run on similar devices. In view of this overlap, those executables and devices might be good candidates for a new computing platform definition. The existing computing system may thus be reconfigured to include one or more data centers that implement common computing platforms in accordance with the new computing platform definition. An administrative team may also discover that particular executables require a certain level of computing resources (e.g., storage, memory, processing speed) in order to operate effectively and efficiently. In view of these requirements, computing platform definitions that include those executables may be configured to also include specifications for devices capable of providing the desired service levels.

As noted above, utilizing computing platform definitions as described herein facilitates the configuration, deployment, maintenance, and modification of those computing platforms. Since each computing platform is an individual instance of a computing platform definition, the computing platforms may be understood as segmented from one another and thus be described as segmented computing platforms. Each segmented computing platform may be uniquely identifiable via a unique identifier such as, e.g., a unique addressable namespace. Segmenting computing platforms also allows for efficient evaluation of the performance of a computing platform, e.g., to identify desired modifications. For example, administrative teams may assess whether modifications to a computing platform are needed to, e.g., add resources that can accommodate increased demand or decommission unused resources.

Segmenting computing platforms thus provides various advantages associated with computer security. Such advantages include those associated with access control whereby users (and other computing resources) may be limited to accessing only those devices and executables of a particular computing platform. In other words, access control may be provided at the computing platform level such that users (and other computing resources) are prevented from accessing computing platforms they are not authorized to access. Segmenting computing platforms also isolates the network devices (e.g., routers, switches, gateways) of one computing platform from those of other computing platforms thus allowing for efficient control over the communications exchanged between computing platforms. Segmenting computing platforms likewise isolates the data utilized at a particular computing platform thus also allowing for efficient control over if, when, and how that data is accessed from other computing platforms. Stated more generally, segmenting computing platforms advantageously facilitates prevention of unauthorized cross-platform access.

With respect to deployment and modification, a computing platform definition and corresponding orchestration engine facilitate the processes of building, installing, and updating the executables of a computing platform. For example, build dependencies and installation sequences for the executables may be defined at the computing platform level and indicated in the computing platform definition. The orchestration engine may thus utilize the computing platform definition to automate the process of building new or updated executables in accordance with the specified build dependencies and deploying those new or updated executables in accordance with the specified installation sequence to each of the computing platforms that implement that computing platform definition. In addition, modifications to a computing platform may be identified at the computing platform level by changing, e.g., the devices, the executables, the specifications, the configuration settings, and the like of the computing platform definition. Modifications may include, for example, a change to a specification of a device of the computing platform (e.g., storage capacity, memory, processing speed), a change to a configuration setting of a device or executable of the computing platform (e.g., security settings, logging settings), the addition of a new device or executable, and the removal of an existing device or executable. In turn, the orchestration engine may perform a comparison between the modified computing platform definition and a particular computing platform that implements the computing platform definition. The orchestration engine may flag discrepancies between the existing implementation of the computing platform and the modified computing platform definition. In response to such discrepancies, the orchestration engine may, e.g., provide a notification of the discrepancy or initiate an automated deployment process to address the discrepancy. For example, when the computing platform definition is modified to add a new device or remove an existing device, the notification may prompt an administrator to install a new device at the data center implementing the computing platform or decommission an existing device of the computing platform. As another example, when the computing platform definition is modified to add a new executable, update an existing executable, or remove an existing executable, the orchestration engine may initiate, for each data center that implements the computing platform, an automated build and deploy process for the new or updated executable or an automated uninstall process to remove the existing executable.

With respect to maintenance, a computing platform definition and corresponding orchestration engine facilitate the processes of testing and troubleshooting computing platforms. As discussed in further detail below, a computing platform definition may indicate test cases and test data used to test a computing platform that implements the computing platform definition. The computing platform definition may also specify the test data used by the test cases and data pre-processing rules for the test cases. The computing platform definition advantageously allows a computing platform to be implemented in a testing environment that corresponds to the computing platform implemented in the production environment. The orchestration engine may thus orchestrate execution of the test cases in the testing environment, e.g., before updates are implemented at the corresponding production environment. The computing platform definition may also advantageously allow a computing platform to be implemented in an ad hoc fashion, e.g., whenever testing of a particular computing platform is desired. Additionally or alternatively, the orchestration engine may orchestrate execution of the test cases on a computing platform implemented in the production environment itself, e.g., as a periodic evaluation of the status of that computing environment.

In addition, computing platform definitions facilitate effective and efficient maintenance of computing platforms implemented according to a particular computing platform definition. For example, technical issues detected at one computing platform may be anticipated and proactively addressed at other computing platforms that implement the same computing platform. Furthermore, remedies that address those technical issues may be provided by updating the computing platform definition and then deployed to each computing platform that implements that computing platform definition.

As also described in further detail below, a computing platform definition may include various types of standards that the orchestration engine may enforce. The standards may include, for example, code standards for the source code of the executables indicated in the computing platform definition, configuration standards for the devices and executables indicated in the computing platform definition, and the like. Enforcing the standards of a computing platform definition may be part of the orchestration pipeline executed by the orchestration engine.

The advantages discussed above are just some of those gained by utilizing computing platform definitions to implement computing platforms of a computing system. Additional advantages will be recognized and appreciated with the benefit of the additional disclosures described in further detail below.

It is also to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, "set" as used in this description refers to a collection that may include one element or more than one element. Moreover, aspects of the disclosure may be implemented in non-transitory computer-readable media having instructions stored thereon that, when executed by the circuitry of a processor, cause the processor to perform various steps described in further detail below. As used in this description, non-transitory computer-readable media refers to all computer-readable media with the sole exception being a transitory propagating signal.

Turning now to FIG. 1, a block diagram of an example computing system 100 in accordance with aspects of the present disclosure is shown. The computing system 100, in this example, includes a computing platform maintenance system 102, a computing platform orchestration system 104, data centers 106a-b, and remote computing devices 108. The computing platform configurations system 102 is communicatively connected to the computing platform orchestration system 104 which is also communicatively connected to the data centers 106a-b and the remote computing devices 108. The remote computing devices 108, in this example, are also communicatively connected to the computing platform configuration system 102. The connections between the components of the computing system may include wired and/or wireless connections and occur via one or more networks, e.g., wired and/or wireless local area networks (LANs), wide area networks (WANs) such as the Internet and cellular networks, and combinations thereof.

The computing platform maintenance system 102, in this example, operates to create and store computing platform definitions as well as provide access to their content. The computing platform maintenance system 102 includes a computing platform definition repository 110, a computing platform management user interface 112, a computing platform application programming interface (API) 114, and a computing platform rule repository 116. The computing platform definition repository 110 stores a set 118 of computing platform definitions 120, and the computing platform rule repository 116 stores a set 122 of computing platform rules 124. As described in further detail below, the computing platform management interface 112 facilitates the management of computing platforms, computing platform definitions, and computing platform rules. As also described in further detail below, the computing platform API 114 provides a way for other components of the computing system 100—e.g., the computing platform orchestration system 104—to access a computing platform definition 120 or a computing platform rule 124.

The computing platform user interface 112 operates receive user input and provide output associated with computing platforms, computing platform definitions, and computing platform rules. For example, the computing platform user interface 112 may provide interactive displays configured to receive user input to create, edit, and/or view a computing platform definition 120 or a computing platform rule 124. The interactive displays may thus include user interface elements used to create and configure the content of a computing platform definition 120 or a computing platform rule 124. In one example implementation, the computing platform user interface 112 may provide an interactive display that includes a selectable list of the set 118 of computing platform definitions 120 stored at the computing platform definition repository 110. Selecting one of the computing platform definitions in the list may cause the computing platform management user interface 112 to then provide various interactive displays that present the content of the computing platform definition—e.g., a list of devices and a list of executables—and that present user interface elements for configuring that content. The computing platform user interface 112 may provide similar interactive displays for viewing and configuring computing platform rules.

In some example implementations, the computing platform user interface 112 may also provide interactive displays for viewing the status of the computing platforms that have been implemented at the data centers (e.g., data centers 106a-b) of the computing system 100. Accordingly, the computing platform user interface 112 may provide various interactive displays that include, e.g., a selectable list of the data centers of the computing system, a selectable list of the computing platforms implemented at a data center, a selectable list of the devices deployed to a computing platform, and a selectable list of the executables deployed to a device, and the like. A user may thus navigate the implementation of a computing platform by selecting data centers, computing platforms, devices, and executables of interest. Through these interactive displays, users (e.g., administrators) may assess the current and historical status of the computing platforms and its associated devices and executables. Status information may include, e.g., storage capacity, processor usage, memory usage, network bandwidth usage, network latency, request/response latency, number of users, error rates, and the like. In this way, users may evaluate whether modifications to the computing platform are necessary, e.g., to add additional computing resources to meet high demand, to change configuration settings of existing computing resources, or to decommission unused resources.

The computing platform management user interface 112 may be implemented in various ways. For example, the computing platform management user interface 112 may include one or more of a desktop application installed at the computing platform maintenance system 102 itself or one of the remote computing devices 108, a web application (e.g., a computing platform management dashboard) accessed via a web browser, a mobile application installed at a mobile computing device (e.g., a tablet computer, a mobile telephone), and a command line interface. Additional and alternative techniques may be selectively employed to implement the computing platform management interface 112.

The computing platform definition repository 110 includes a data store that stores the set 118 of computing platform definitions 120. Various techniques may be selectively employed to implement a computing platform definition 120, and those techniques will be discussed in further detail below with reference to FIG. 2 and FIG. 5. In general, a computing platform definition 120 indicates a set of devices and a set of executables that make up the computing platform. As discussed above, a computing platform may be configured to support a particular aspect of an organization. As an example, in the context of a computing system that supports a banking institution, various computing platforms may respectively support individual lines of business of the bank which may include, e.g., a line of business that handles personal banking for bank customers, a line of business that handles investment portfolios for bank customers and the like. The personal banking line of business may require a computing platform that provides, e.g., the devices and executables necessary to access and maintain personal banking accounts (e.g., deposits, withdrawals, account transfers, and the like). Such devices and executables, in this example, may include those utilized by the baking customers themselves (e.g., web-based account profiles) as well as customer service representatives (e.g., bank tellers and call center agents.). It will be appreciated with the benefit of this disclosure that this example "personal banking" computing platform definition may be selectively configured according to the goals and preferences associated with a particular implementation. For example, in one implementation, a "personal banking" computing platform definition may be configured to identify the devices and executables utilized by both the bank customers and the bank employees. In another implementation, however, two "personal banking" computing platform definitions may be created—one that indicates the devices and executables utilized by the bank customers for personal banking activities (e.g., a "bank customer personal banking" computing platform) and one that indicates the devices and executables utilized by the bank employees for personal banking activities (e.g., a "bank employee personal banking" computing platform). In this latter example, it will also be appreciated that a single data center may nevertheless implement each of the two "personal banking" computing platforms for the bank customers and bank employees respectively. Additional and alternative examples will be appreciated with the benefit of this disclosure.

The computing platform rule repository includes a data store that stores the set 122 of computing platform rules 124. A computing platform rule 124 may be associated with a particular stage of the orchestration pipeline (e.g., the testing stage, the scanning stage, and the enforcement stage). A computing platform rule 124 may, for example, specify criteria that must be satisfied for a stage of the orchestration pipeline to start or complete successfully. Examples of such criteria include, e.g., a minimum number or percentage of test cases that must pass for successful completion of the testing stage, a maximum number or percentage of test cases that can fail before the testing stage fails, data processing rules (e.g., normalization, randomization, sanitization), rules that the source code of the executables must satisfy, the extent to which an implementation rather of a computing platform may deviate from its corresponding computing platform definition, and the like. The set 122 of computing platform rules 124 may, in some example implementations, be global rules that apply to each computing platform definition 120 created. In other example, implementations, various computing platform rules 124 may selectively apply to individual computing platform definitions 120. A computing platform definition 120, for example, may be configured to reference or otherwise indicate one or more of the computing platform rules 124 stored in the computing platform rule repository 116. The computing platform rules 124 indicated in a computing platform definition 120 may thus apply to any computing platforms that implement that computing platform definition. Separating the computing platform rules 124 from the computing platform definitions 120 to which those rules apply thus facilitates efficient management and maintenance of the computing platform rules. For example, a user need only update a computing platform rule 124 once, and any changes will be available to each computing platform definition 120 that references or otherwise indicates that rule.

The computing platform API 114 is a mechanism for accessing the content of a computing platform definition 120. As seen in FIG. 1, the computing platform API 114 may be accessed by the computing platform orchestration system 104 which may submit requests to and receive response from the computing platform API 114. Accordingly, the API 114 includes a set of callable units that may be invoked to provide access to the computing platform definition and its contents. As described in further detail below, the computing platform API may provide a requested computing platform definition 120 itself or requested content from a particular computing platform definition.

The computing platform API 114 may be selectively implemented in various ways. Techniques that may be employed for implementing the computing platform API include a service such as a web service, a set of remote procedure calls, a software library or framework, a series of uniform resource indicator (URI) paths to a corresponding folder structure, and the like. Accordingly, depending on its particular implementation, a computing platform API may reside at a computing platform orchestration system in alternative implementations rather than at the computing platform maintenance system 102 as shown by way of example in FIG. 2. The computing platform API is discussed in further detail below with respect to FIG. 4.

The computing platform orchestration system 104, in this example, operates to carry out an orchestration pipeline associated with a computing platform. An orchestration pipeline, in some example implementations, may include a build stage, a deployment stage, a testing stage, a scanning stage, and an enforcement stage. Executing an orchestration pipeline may include executing each stage of the orchestration pipeline in sequence, executing a subset of the stages (e.g., build, deploy, test), or executing individual stages (e.g., on demand). The various stages of an orchestration pipeline will be discussed in further detail below. The computing platform orchestration system 104, in this example, includes an orchestration engine 126 that orchestrates execution of the orchestration pipeline, a set 128 of orchestration definitions 130 utilized to carry out the stages of the orchestration pipeline, and an orchestration user interface 132 for selectively controlling operation of the orchestration engine.

The orchestration engine 126 operates to execute the various stages of the orchestration pipeline. As noted above, the orchestration engine 126 utilizes various orchestration definitions 130 when executing the stages of the orchestration pipeline. The orchestration definitions 130 includes, for example, pipeline definitions that specify the stages of an orchestration pipeline and the sequence of those stages, stage definitions that specify the actions to perform during an orchestration stage and the sequence of those actions, and event definitions the specify actions to perform in response to events observed during execution of the orchestration pipeline or one of its stages. Accordingly, a pipeline definition may indicate one or more of the stage definitions and one or more of the event definitions. For example, one pipeline definition may identify respective stage definitions for each stage of an orchestration pipeline (e.g., build, deploy, test, scan, and enforce) while another pipeline definition may identify a subset of the available stage definitions (e.g., build, deploy, and test). Stage definitions may also indicate one or more triggers that initiate execution of a stage of the orchestration framework. As one example, a commit of new or updated source code to a source code repository may trigger the build stage of an orchestration pipeline. Additional examples of triggers will be discussed in further detail below. The event definitions may indicate various actions to perform upon completion of a stage of the orchestration pipeline and the results or outcome of that stage, e.g., what to do in the event that a stage was or was not successfully completed. As one example, an event definition may indicate that an administrator should be notified in the event that the testing stage of the orchestration pipeline failed. As another example, an event definition may indicate that an administrator should be notified when it is determined that a computing platform deviates from its corresponding computing platform definition by more than a predetermined deviation threshold, e.g., upon completing the enforcement stage of the orchestration pipeline. Additional examples will be appreciated with the benefit of this disclosure, e.g., providing notifications when an executable fails to build or deploy, when a threshold amount of test cases fail, when a threshold amount of code standards are violated, and the like.

The orchestration user interface 132 operates to receive user input and provide output associated with an orchestration pipeline and its various stages. For example, the orchestration user interface may provide interactive displays for selecting and initiating the orchestration pipeline or various stages of the orchestration pipeline. In addition, the orchestration user interface 132 may present the outcome or results of an orchestration pipeline and its various stages, e.g., whether the pipeline and/or stages completed successfully.

Like the computing platform management user interface 112, the orchestration user interface 132 may be implemented in various ways. For example, the orchestration user interface 132 may include one or more of a desktop application installed at the computing platform orchestration system 104 itself or one of the remote computing devices 108, a web application (e.g., a computing platform management dashboard) accessed via a web browser, a mobile application installed at a mobile computing device (e.g., a tablet computer, a mobile telephone), and a command line interface. Additional and alternative techniques may be selectively employed to implement the computing platform orchestration 132.

As noted above, the computing platform orchestration system 104 is communicatively connected to various data centers, e.g., data centers 106a-b in this example. As also noted above, the data centers such as data centers 106a-b, in this example, are communicatively connected to the computing platform orchestration system 104. Each data center 106a-b, in this example, implements at least one computing platform, and those computing platforms may be the same or different computing platform definitions. Data center 106a, in this example, is illustrated as implementing two computing platforms 134a-b. For the sake of discussion, assume that each computing platform 134a-b implements the same computing platform definition. The computing platforms 134a-b thus provide a common set of executables 136 and common sets of devices 138a-c. The set of executables 136 may include, for example, applications, services, programs, frameworks, and the like. The sets of devices 138a-c may include sets of various types of devices including, for example, a set of storage devices 138a, a set of processing devices 138b (e.g., web servers, application servers), and a set of network devices 138c (e.g., routers, switches, gateways). The sets of devices may also include peripheral devices including input devices (e.g., a keyboard, a mouse, a microphone, a camera, a scanner) and output devices (e.g., display screens, speakers, printers). Although the computing platforms 134a-b implement the same computing platform definition, the computing platforms are segmented from each other at the data center 106a as described above. Accordingly, the set of executables 136 and sets of devices 138a-c at computing platform 134a are segmented from those at computing platform 134b. Furthermore, the computing platform orchestration system may be communicative connected to computing platforms implemented at multiple data centers, e.g., computing platforms 134a-b at data center 106a and computing platform 134c at data center 106b.

As also noted above, one or more remote computing devices 108 are communicatively connected to the computing platform orchestration system 104 and the computing platform maintenance system 102. The remote computing devices 108 may include various types of computing devices such as, for example, computing devices having test data repositories, computing devices configured for code development, testing, and versioning, computing devices configured for remotely accessing the computing platform orchestration system 104 and the computing platform maintenance system 104 (e.g., via a desktop, mobile, or web application). Additional and alternative types of remote computing devices 108 will be appreciated with the benefit of this disclosure.

Figure 2:
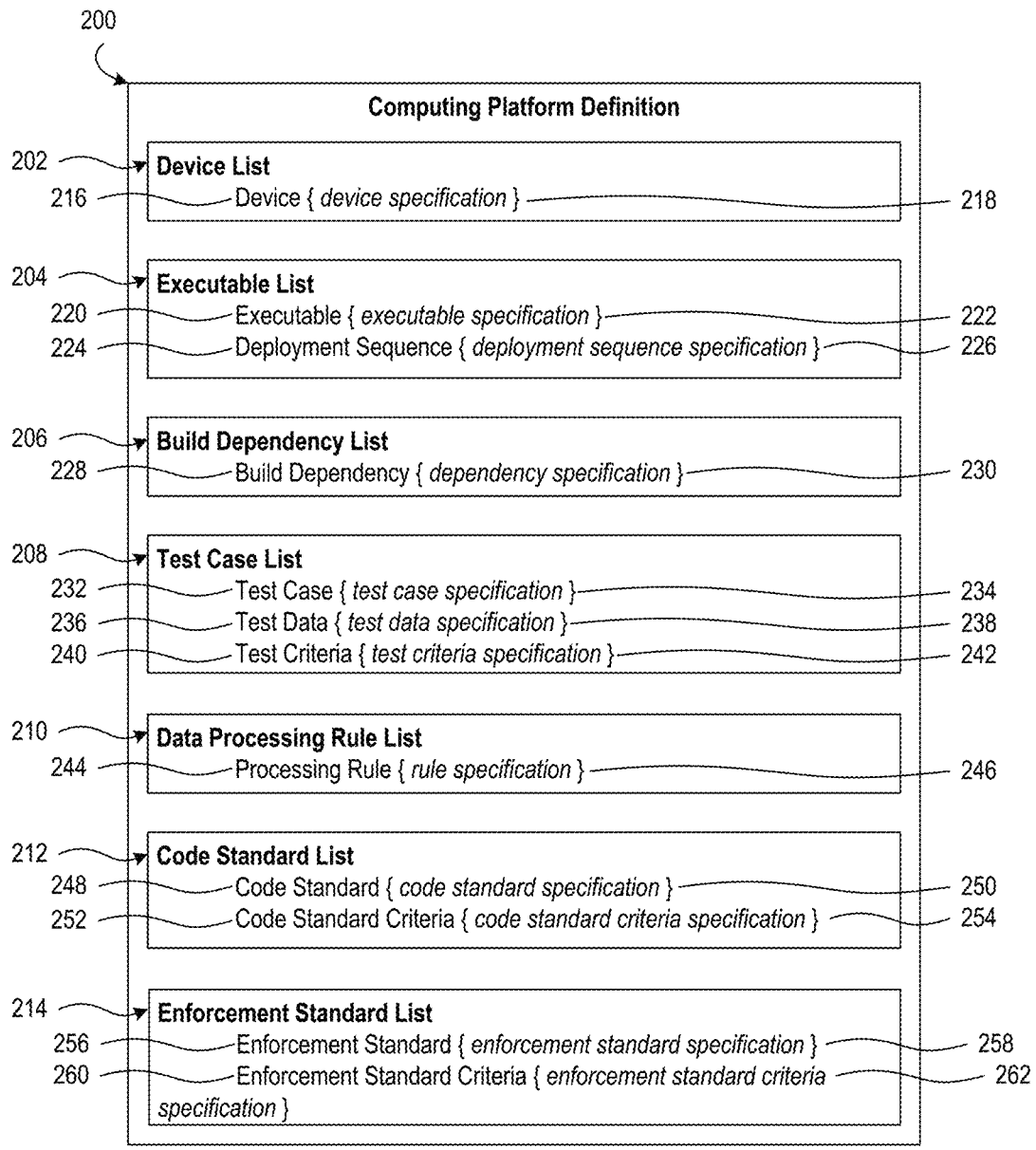
FIG. 2 is logical representation of an example of an implementation of a computing platform definition.

In FIG. 2, a logical representation of an example computing platform definition 200 in accordance with aspects of the present disclosure is shown. The computing platform definition 200 is described by way of example only to convey various principles associated with computing platform definitions. It will be appreciated that particular implementations of computing platform definitions may include a subset of the content described in further detail below, additional content, and/or alternative content which will be appreciated with the benefit of this disclosure.

The computing platform definition 200, in this example, includes content directed to the devices, executables, build artifacts, test cases, rules, and standards for a computing platform. Accordingly, the computing platform definition 200, in this example, includes a device list 202, an executable list 204, a build dependency list 206, a test case list 208, a data processing rule list 210, a code standard list 212, and an enforcement standard list 214. It will be appreciated with the benefit of the disclosures provided below, that the devices, executables, configuration settings, rules, and standards for a computing platform may be defined once at a computing platform definition and inherited by each computing platform that implements that definition.

The device list 202 indicates the hardware devices for the computing platform which may include storage devices, processing devices, network devices, peripheral devices, and the like. The device list 202 may include, for each device listed, a device entry 216 and a corresponding device specification 218. The device entry 216 may indicate a unique identifier, a name, a description, a type, and the like. The device specification 218 may specify the device characteristics that the device must satisfy. For example, a device specification 218 may specify a required processor speed, storage capacity, memory, operating system, networking capabilities, input capabilities, output capabilities, device permissions, and the like. The device specification 218 may include additional and alternative types of device information.

The executable list 204 indicates the executables for the computing platform which may include applications, programs, services, and the like. The executable list 204 may indicate, for each device listed, an executable entry 220 and a corresponding executable specification 222. The executable entry 220 may include a unique identifier, a name, a description, a type, and the like. The executable specification 222 may specify the executable characteristics that the executable must satisfy. For example, an executable specification 222 may specify a required executable version, executable configuration settings, executable permissions, and the like. The executable specification 222 may also indicate a device the executable should be deployed to. The executable specification 222 may include additional and alternative types of executable information. The executable list 204, in this example, also includes a deployment sequence entry 224 and a corresponding deployment sequence specification 226. The deployment sequence specification 226 of the deployment sequence entry 224 may indicate the sequence in which the executables of the computing platform should be deployed to the respective devices of the computing platform. The deployment sequence specification 226 of the deployment sequence entry 224 may additionally or alternatively indicate the sequence in which the build artifacts of a particular executable should be deployed to a device of the computing platform. Accordingly, the executable list of a computing platform definition may include multiple deployment sequence entries, e.g., an overall deployment sequence entry for the executables of the computing platform and multiple deployment sequence entries for the build artifacts of respective executables of the computing system.

The build dependency list 206 indicates the build dependencies for the executables of the computing system. Build dependencies may include, for example, libraries, frameworks, other executables, and the like that should also be built during any build of the executable itself. The build dependency list 206 may include, for one or more of the executables of the computing platform, a build dependency entry 228 and a corresponding build dependency specification 230. The build dependency entry 228 may indicate the executable it is associated with, e.g., via the unique identifier associated with the executable. The build dependency specification 230 of a build dependency entry 228 may indicate one or more build dependencies (e.g., via a unique identifier) as well as a build sequence for the build dependencies. The build dependency list 206 may include multiple build dependency entries for respective executables of a computing platform. The build dependency specification 230 of a build dependency entry 228 may include additional and alternative types of build dependency information.

The test case list 208 indicates the test cases to be executed for a computing platform, e.g., during the testing stage of the orchestration pipeline. The test cases may include test cases for unit testing, integration testing, system testing, regression testing, performance testing, usability testing, security testing, and the like. The test case list 208 may include, for each test case, a test case entry 232 and a corresponding test case specification 234. The test case specification 234 of a test case entry 232 may indicate, for example, a device of the computing platform at which to execute the test case or an executable of the computing platform for which to execute the test case. The test case specification 234 may, in some example implementations, explicitly specify the test case to perform for the computing platform. Alternatively, the test case specification 234 may simply reference (e.g., via a unique identifier) a test case defined and stored elsewhere in a computing system, e.g., at a computing platform maintenance system 102 or a remote computing device 108. In some example implementations, a test case list may include test case entries that explicitly specify the test case to perform as well as test case entries that reference test cases defined and stored elsewhere. In this way, global test cases may be defined for all computing platforms and referenced by their corresponding computing platform definitions while still allowing local test cases to be defined and configured for a particular computing platform.

The test case list 208 may also indicate the test data to utilize when executing the test cases. Accordingly, the test case list 208, in this example, also includes a test data entry 236 and a corresponding test data specification 238. A test data entry 236 may be associated with one or more of the test case entries 232. The test data specification 238 may thus identify (e.g., via a unique identifier) the respective test case entries 232 the test data entry is associated with. A test data specification 238 may explicitly specify the test data to utilize for a test case or may include a reference to a test data repository to utilize for the test case. For example, a test data specification 238 may specify the location of a test data repository, e.g., a network address, a device address, a table, a column, or a row of a test data database, and the like. As noted above, the test data repository referenced by a test data specification 238 may be located at a remote computing device 108 (FIG. 1). The test data entries 236 of the test case list 208 may be utilized to configure (e.g., pre-configure or on-demand) a test data repository in a testing environment for testing a computing platform that implements the computing platform definition 200.

The test case list 208 may additionally indicate test criteria for the test case entries 232 of the test case list. Accordingly, the test case list 208, in this example, also includes a test criteria entry 240 and a corresponding test criteria specification 242. The test criteria specification 242 may indicate criteria that the results of the test cases must satisfy in order for a testing stage to be successfully completed. For example, the test criteria specification 242 may indicate a threshold amount (e.g., a number, a percentage) of the test cases that must pass to successfully complete the testing stage. The test criteria specification 242 may also indicate one or more particular test cases that must pass to successfully complete the testing stage (e.g., test cases that are critical or otherwise identified as important test cases). Additional and alternative types of test criteria may be selectively employed.

The data processing rule list 210 indicates how data associated with a computing platform should be processed (e.g., pre-processing or post-processing of the data). Processing the data associated with a computing platform may include sanitizing the data (e.g., to remove personal identifying information), randomizing the data, protecting the data (e.g., via encryption), and the like. Accordingly, the data processing rule list 210, in this example, includes a processing rule entry 244 and a corresponding processing rule specification 246. The processing rule specification 246 may indicate the type of data to which the rule applies (e.g., live data, test data) and how the data should be processed (e.g., sanitized, randomized, encrypted). Additional and alternative types of processing rules may be selectively employed.

The code standard rule list 212 indicates standards that the source code of the executables of the computing platform must (or should) satisfy. The code standards may be directed to, for example, security standards (e.g., authentication, authorization, code vulnerabilities), stability standards (e.g., input validation, error handling, logging), style standards (e.g., tabs versus spaces), best practices, and the like. Code standards may be enforced during the scanning stage of the orchestration pipeline in which the orchestration engine evaluates the source code and applies the code standards. Accordingly, the code standard list 212, in this example, includes a code standard entry 248 and a corresponding code standard specification 250. The code standard entry 248 may correspond to a global code standard that applies to the source code of each executable of the computing platform or may correspond to a code standard that only applies to a subset of the executables of the computing platform (e.g., one or more). A code standard specification 250 may thus indicate, for example, one or more executables of the computing platform (e.g., via a unique identifier for the executable), the type of code standard (e.g., security, stability, style), and the like. A code standard specification 250 also may explicitly indicate the code standard that the source code must satisfy or may reference a code standard (e.g., via a unique identifier) defined and stored elsewhere, e.g., at a remote computing device 108 (FIG. 1). Additional and alternative types of code standards may be selectively employed.

The code standard list 248 may additionally indicate code standard criteria for the code standard entries 248 of the code standard list. Accordingly, the code standard list 212, in this example, also includes a code standard criteria entry 252 and a corresponding code standard criteria specification 254. The code standard criteria specification 252 may indicate criteria that the code evaluations must satisfy in order for a scanning stage to be successfully completed. For example, the code standard criteria specification 252 may indicate a threshold amount (e.g., a number, a percentage) of the code standards that must pass to successfully complete the scanning stage. The code standard specification 252 may also indicate one or more particular code standards that must be satisfied to successfully complete the scanning stage (e.g., code standards that are critical or otherwise identified as important code standards). Additional and alternative types of code standard criteria may be selectively employed.

The enforcement standard list 214 indicates standards that the computing platform itself must (or should) satisfy. It will be appreciated that particular implementations of a computing platform may, in some instances, not precisely match its corresponding computing platform definition. For example, the particular implementation of a computing platform may drift over time if devices and/or executables are added and/or removed from the computing platform, e.g., for testing, maintenance, and the like. An orchestration pipeline may thus include an enforcement stage in which a computing platform is evaluated against its corresponding computing platform definition to determine the extent to which the computing platform deviates from the computing platform definition. For example, the orchestration engine may determine during the enforcement stage whether, e.g., the computing platform includes the devices and executables indicated in the computing platform definition, whether the computing platform includes devices or executables not indicated in the computing platform, whether the devices and executables are configured according to the device specifications and executable specifications included in the computing platform definition, and the like. Accordingly, the enforcement standard list 214, in this example, includes an enforcement standard entry 256 and corresponding enforcement standard specification 258. An enforcement standard specification 256 may explicitly indicate the enforcement standard that the computing platform must satisfy or may reference an enforcement standard (e.g., via a unique identifier) defined and stored elsewhere, e.g., at a remote computing device 108 (FIG. 1). Additional and alternative types of enforcement standards may be selectively employed.

The enforcement standard list 214 may additionally indicate enforcement standard criteria for the enforcement standard entries 256 of the enforcement standard list. Accordingly, the enforcement standard list 214, in this example, also includes an enforcement standard criteria entry 260 and a corresponding enforcement standard criteria specification 262. The enforcement standard criteria specification 262 may indicate criteria that the computing platform evaluations must satisfy in order for an enforcement stage to be successfully completed. For example, the enforcement standard criteria specification 262 may indicate a threshold amount (e.g., a number, a percentage) of the enforcement standards that must pass to successfully complete the enforcement stage. The enforcement standard specification 262 may also indicate one or more particular enforcement standards that must be satisfied to successfully complete the enforcement stage (e.g., enforcement standards that are critical or otherwise identified as important enforcement standards). Additional and alternative types of enforcement standard criteria may be selectively employed.

The physical implementations of computing platform definitions may take various forms. Techniques that may be employed for implementing a computing platform definition include, e.g., a data model and corresponding database implementing that data model in which tables, columns, and rows correspond to the various components of the computing platform definition, one or more structured text files created using a mark-up language in which tags identify the various components of the computing platform definition (e.g., one or more XML files), a hierarchical tree structure in which the nodes of a tree correspond to the various components of the computing platform definition, a folder structure in which folder paths to stored configuration files correspond to the various components of the computing platform definition, and additional techniques suitable for indicating the various components of a computing platform definition such as those discussed above with reference to the computing platform definition 200.

Figure 3:
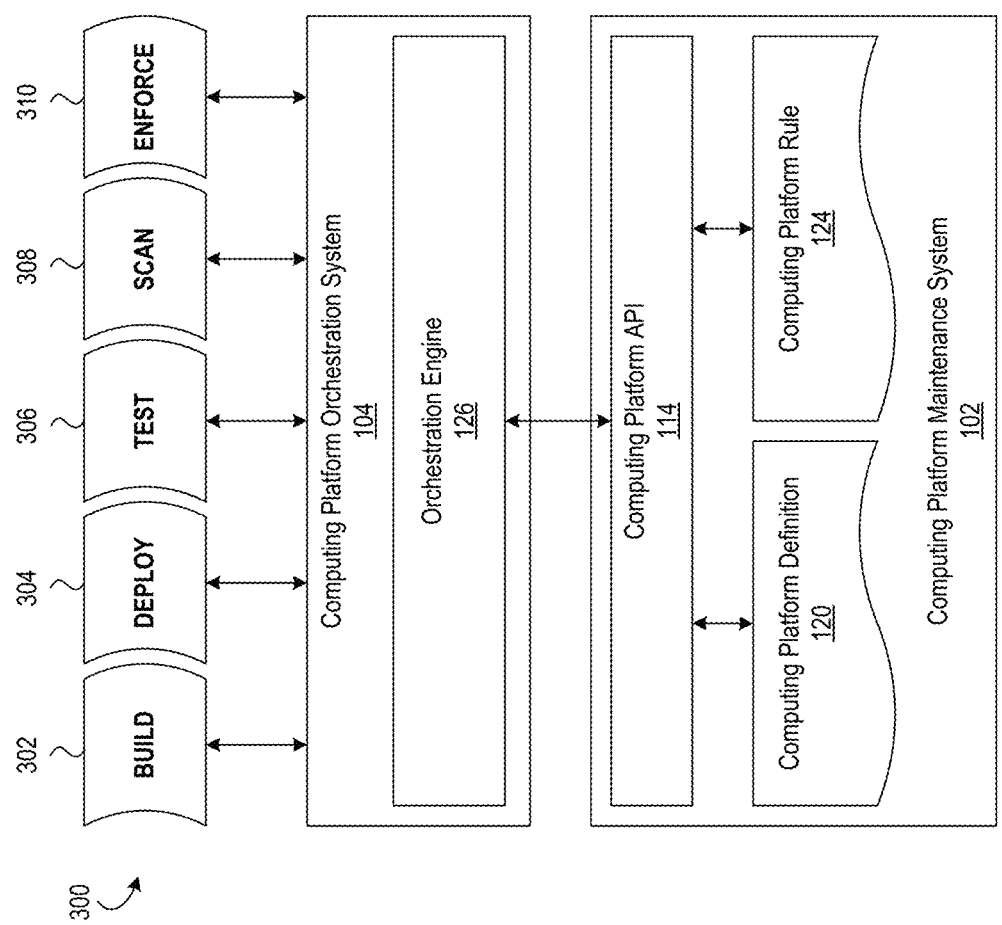
FIG. 3 is a block diagram of an example orchestration workflow executed by a computing platform orchestration system that interfaces with a computing platform maintenance system.

In FIG. 3, a block diagram of an example orchestration pipeline 300 in accordance with aspects of the present disclosure is shown. The orchestration pipeline 300, in this example, includes multiple stages which include a build stage 302, a deploy stage 304, a test stage 306, a scan stage 308, and an enforcement stage 310. As noted above, alternative orchestration pipelines may include a subset of the stages 302-310, include additional stages, and include alternative stages. Furthermore, the stages 302-310 of the orchestration pipeline may each be executed in the sequence depicted in FIG. 3, executed in alternative sequences, executed individually, and the like. In this example, the orchestration engine 126 of the computing platform orchestration system 104 orchestrates operation of orchestration pipeline 300 and its individual stages 302-310. The orchestration engine 126 may carry out the orchestration pipeline 300 with respect to individual computing platforms of a computing system.

The orchestration pipeline 300 may be configured such that completion of each stage 302-310 triggers the next stage in the orchestration pipeline. Additional and alternative triggers, however, may initiate the respective stages 302-310 of the orchestration pipeline 300. For example, the orchestration pipeline 300 and/or its various stages 302-310 may be triggered at the start of a predetermined time period, e.g., once an hour, once a day, once a week, once a month, and the like. In various implementations, a user may specify (e.g., via an orchestration user interface 132) the frequency with which the orchestration pipeline 300 and/or its individual stages 302-310 are carried out. As another example, the orchestration pipeline 300 and/or its various stages 302-310 may be triggered in response to detection of an event associated with the computing platform. The build stage 302 and/or the scan stage 308, for example, may be triggered in response to detecting a commit of source code associated with an executable of a computing platform. The deploy stage 304 may be triggered in response to a successful build of an executable associated with a computing platform. The test stage 306 may be triggered in response to detecting a successful deployment of build artifacts to a computing platform. The orchestration pipeline 300 and/or its various stages 302-310 may be triggered on-demand, e.g., via user selections received at an orchestration user interface (e.g., orchestration user interface 132). For example, a user may navigate various interactive displays presented by an orchestration user interface 132 (FIG. 1) to select a data center and a corresponding computing platform and to select a stage of the orchestration pipeline to perform with respect to the selected computing platform.

The build stage 302 of the orchestration pipeline 300, as noted above, generates the build artifacts of the executables of a computing platform. The deployment stage 304 deploys the build artifacts to the appropriate devices of the computing platform. The testing stage 306 executes the test cases associated with a computing platform. The scanning stage 308 evaluates the source code of the executables of a computing device and applies code standards defined for the computing platform. Finally, the enforcement stage 310 evaluates a computing platform to determine the extent to which it conforms to or deviates from its corresponding computing platform definition.

During operation of the orchestration pipeline 300 and its various stages 302-310, the orchestration engine 126 accesses the computing platform definition 120 associated with the respective computing platform. As described above, the orchestration engine 126 invokes the computing platform API 114 to access the computing platform definition 120 and its content. The orchestration engine 126 may also invoke the computing platform API 114 to access computing platform rules 124 associated with the respective computing platform during execution of the orchestration pipeline 300 and/or its various stages 302-310.

Figure 4:
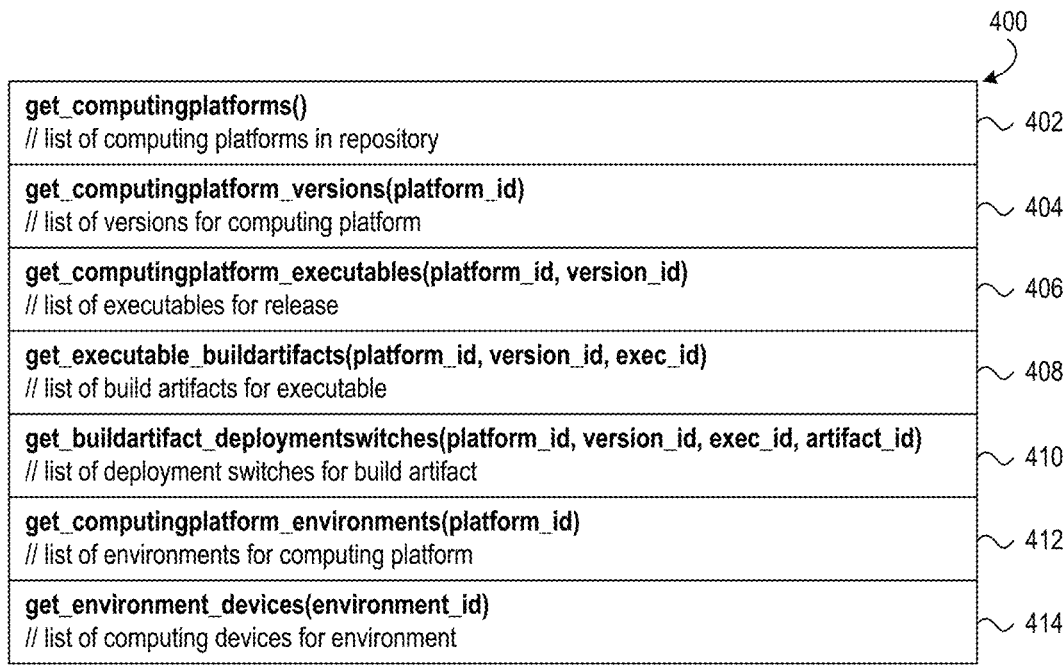
FIG. 4 is a logical representation of a portion of an example of an implementation of an application programming interface (API) of a computing platform maintenance system.

In FIG. 4, a logical representation of a portion of a computing platform application programming interface (API) 400 in accordance with aspects of the present disclosure is shown. In this example, the callable units of the computing platform API 400 are implemented as a set of functions that may be invoked by an orchestration engine (e.g., orchestration engine 132). As seen in FIG. 4, the functions of this portion of the example API 400 are configured to retrieve content from a computing platform definition using unique identifiers associated with the components of a computing platform. As also seen in FIG. 4, the example functions are configured to retrieve information regarding aspects of a computing platform including, e.g., a function 402 to retrieve a list of computing platforms of the computing system, a function 404 to retrieve a list of versions of a particular computing platform, a function 406 to retrieve a list of executables for a particular version of a particular computing platform, a function 408 to retrieve a list of build artifacts for a particular executable of a particular version of a particular computing platform, a function 410 to retrieve a list of deployment switches for a particular build artifact of a particular executable of a particular version of a particular computing platform, a function 412 to retrieve a list of environments of a particular computing platform, and a function 414 to retrieve a list of computing devices of a particular environment. Versions, environments, and deployments switches will be discussed in further detail below with reference to FIG. 5.

The functions 402-414 of the portion of the example computing platform API 400 are provided by way of example only. The API 400 may, for example, include additional functions to access a computing platform definition and/or its contents. For example, the computing platform API 400 may include functions to retrieve the following information associated with a computing platform: a deployment sequence for the executables of a computing platform (e.g., get_deploymentsequence(platform_id, version_id); a list of build dependencies for the executables of a computing platform and/or a particular executable (e.g., get_builddependencies(platform_id, version_id), get_bubilddependencies(exec_id)); a list of test cases for a computing platform, a particular device of the computing platform, and/or a particular executable of the computing platform (e.g., get_testcases(platform_id, version_id), get_testcases(device_id), get_testcases(exec_id)); a list of test data used to test a computing platform, a particular device of the computing platform, and/or a particular executable of the computing platform (e.g., get_testdata(platform_id, version_id), get_testdata(device_id), get_testdata(exec_id)); a list of the data processing rules for a computing platform (e.g., get_dataprocessingrule(platform_id, version_id)); a list of the code standard rules and the corresponding code standard criteria for a computing platform (e.g., get_codestandards(platform_id, version_id), get_codestandardcriteria(platform_id, version_id)); a list of the enforcement standards and the corresponding enforcement standard criteria for a computing platform (e.g., get_enforcementstandards(platform_id, version_id), get_enforcementstandardcriteria(platform_id, version_id)); and additional types of functions that will be appreciated with the benefit of this disclosure. The API 400 may also include additional functions to retrieve specifications for particular components of a computing platform definition. For example, the computing platform API 400 may include the following functions that provide the corresponding specification for an entry in a computing platform definition: a device specification (e.g., get_device_spec(device_id)), an executable specification (e.g., get_executable_spec(exec_id)), a build dependency specification (e.g., get_dependency_spec(depenency_id)), a test case specification (e.g., get_testcase_spec(testcase_id)), a test data specification (e.g., get_testdata_spec (testdata_id)), a test criteria specification (e.g., get_testcriteria_spec(testcriteria_id)), a data processing rulespecification (e.g., get_dataprocessingrule_spec (dataprocessingrule_id)), a code standard specification (e.g., get_codestandard_spec(codestandard_id)), a code standard criteria specification (e.g., get_codestandardcriteria_spec (codestandardcriteria_id)), an enforcement standard specification (e.g., get_enforcementstandard_spec(enforcementstandard_id)), an enforcement standard criteria specification (e.g., get_enforcementstandardcriteria_spec(enforcementstandardcriteria_id)), and additional types of specifications that will be appreciated with the benefit of this disclosure.

Figure 5:
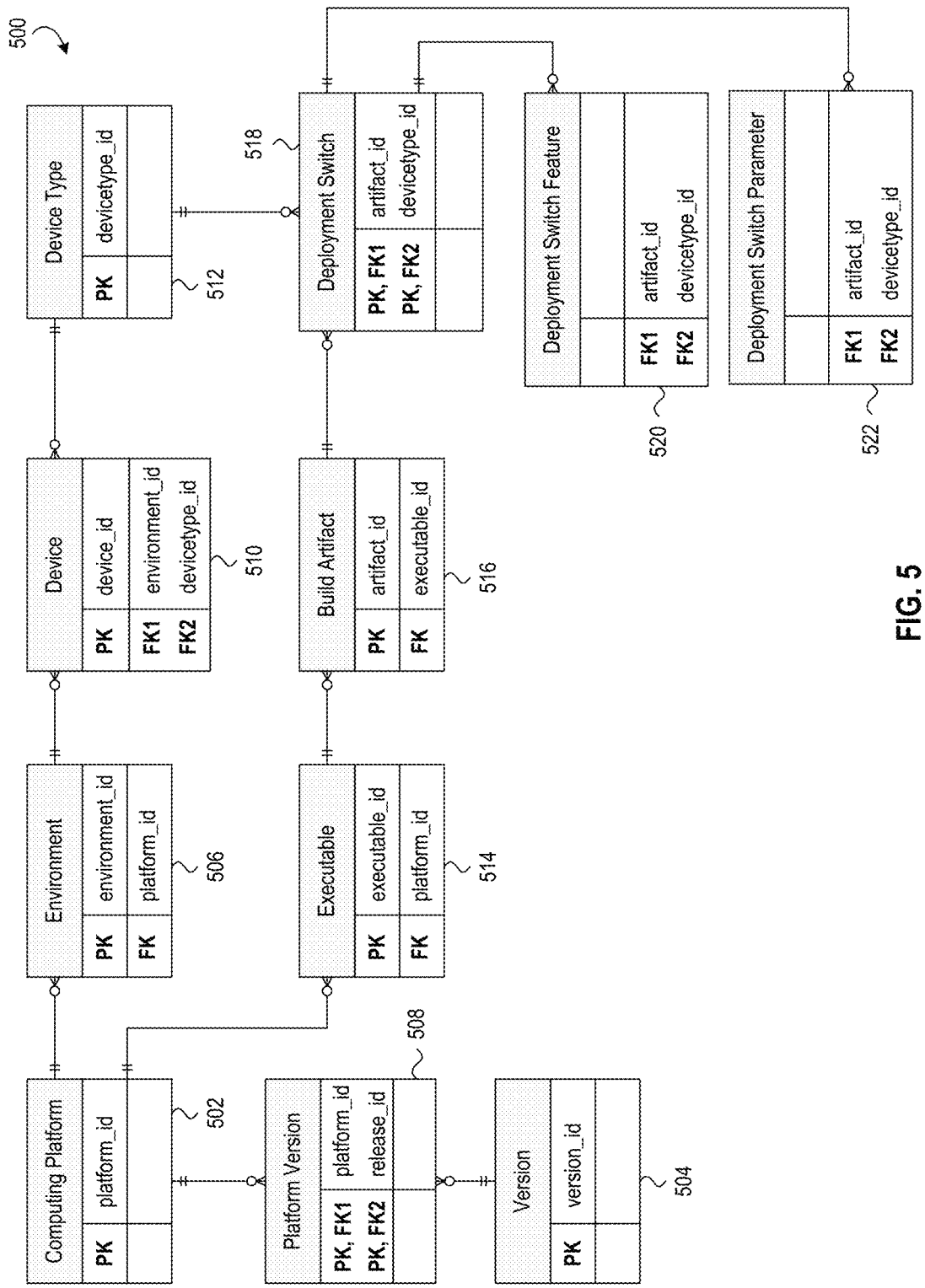
FIG. 5 is an example of an implementation of a portion of a computing platform data model.

In FIG. 5, a portion of an example computing platform data model 500 in accordance with aspects of the present disclosure is shown. As seen in FIG. 5, the computing platform data model 500 includes various entities and relationships directed to a computing platform. The relationships between the entities of the computing platform data model 500 may include one-to-one relationships, one-to-many relationships, and many-to-many relationships. A database may implement the computing platform data model 500, e.g., using database tables and database records. The computing platform data model 500 may thus be employed to implement a computing platform definition as noted above. In FIG. 5, the particular attributes of the entities and relationships, in this example, have been omitted of the sake of clarity. Example attributes, however, are identified below. However, FIG. 5 does identify the respective primary keys and foreign keys used to establish relationships between the entities of the example computing platform data model 500. It will be appreciated that the entities and relationships of the computing platform data model 500 are described by way of example only and that various implementations of a computing platform data model may include additional and alternative entities and/or relationships in accordance with the disclosures provided herein.

The computing platform data model 500 is configured to model a computing platform definition and its various components. Accordingly, the computing platform data model 500, in this example, includes a computing platform entity 502, a version entity 504, and an environment entity 506. The computing platform entity 502 corresponds to the computing platform physically implemented at a data center. Attributes of the computing platform may include, for example, a name, a geographic location, an aspect of an organization the computing platform supports (e.g., a division, department, line-of-business), and other content discussed above with respect to a computing platform. The version entity 504 corresponds to a version of a computing platform. Attributes of the version entity 504 may include, for example, a version number, a release date, an indication of whether the version is the current version, and the like. Versioning advantageously provides a time-dimensioned view of a computing platform definition in which a history of the changes over time to the computing platform definition is available. In addition, versioning advantageously allows a computing system to revert to a previous version of a computing platform. As seen in FIG. 5, an instance of computing platform entity 502 may be related to one or more instances of a version entity 504, and an instance of a version entity may be related to one or more instances of a computing platform entity. Accordingly, the computing platform data model 500, in this example, includes a platform version entity 508 to provide a many-to-many relationship between the computing platform entity 502 and the version entity 504. The environment entity 506, in this example, indicates the context of the computing platform, for example, whether a computing platform is (or should be) implemented in a development environment, a testing environment, or a production environment. Attributes of the environment entity may include, for example, a context (e.g., development, testing, production), and the like. As seen in FIG. 5, an instance of a computing platform entity 502 may be related to one or more instances of an environment entity 504. It will thus be appreciated that the same computing platform may be implemented in each of a development, testing, and production environment based on the same computing platform definition.

The computing platform data model 500, in this example, also includes a device entity 510 and a device type entity 512. The device entity 510 corresponds to a physical device that is (or should be) deployed to a data center for a computing platform. Attributes of the device entity 510 may include, for example, a device name, a device address, and other attributes corresponding to those discussed above with respect to the device specification. As seen in FIG. 5, the device entity 506 is related to both the environment entity 506 and the device type entity 512. Each instance of the device entity 510 is related to one instance of the environment entity 506, and correspondingly an instance of the environment entity may be related to one or more instances of the device entity. Likewise, each instance of the device entity 510 is related to one instance of the device type entity 512, and correspondingly, an instance of the device type entity may be related to one or more instances of the device entity. The device type entity 512 corresponds to a device type of an instance of the device entity 510. As used herein, a device type refers to the set of executables deployed to a device. In other words, a device of a computing platform may be referred to according to the set of executables deployed to the device, and a device type is defined by a set of one or more executables. Two devices having the same set of executables deployed thereto may be considered to be of the same device type. Two devices having a different set of executables deployed thereto may be considered to be of different device types. The executables that define a device type may include, for example, an operating system, a service, an application, a program, a framework, a library, and the like.

The computing platform data model 500, in this example, further includes an executable entity 514 and a build artifact entity 516. The executable entity 514 corresponds to an executable that is (or should be) deployed to a device of a computing platform. Attributes of the executable entity 514 may include, for example, a name, a version, a configuration setting, and other attributes corresponding to those discussed above with respect to the executable specification. The build artifact entity 516 corresponds to a build artifact that is generated during a build of an executable. Attributes of the build artifact entity 516 may include, for example, a name, artifact type, and other attributes corresponding to those discussed above with respect to the build artifact specification. As also noted above, a build artifact refers to the physical files associated with an executable including, e.g., binaries, resource files, configuration files, and the like. As seen in FIG. 5, the executable entity 514 is related to both the computing platform entity 502 and the build artifact entity 516. Each instance of an executable entity 514 is related to one instance of the computing platform entity 502, and correspondingly an instance of the computing platform entity may be related to one or more instances of the executable entity. Similarly, each instance of the build artifact entity 516 is related to one instance of the executable entity 514, and correspondingly an instance of the executable entity may be related to one or more instances of the build artifact entity.

The computing platform data model 500, in this example, additionally includes a deployment switch entity 518. A deployment switch as used herein refers to instructions for deploying the build artifacts of the executables associated with a particular device type. It will be appreciated based on the disclosures above that multiple device types may include the same executable and that, in turn, the build artifacts related to those executables may be related to multiple device types. Accordingly, the deployment switch entity 518 models this many-to-many relationship between instances of a build artifact and instances of a device type. An instance of a build artifact entity 516 may thus be related to one or more instances of the deployment switch entity 518, and similarly an instance of a device type entity 512 may thus be related to one or more instances of the deployment switch entity. A deployment switch may indicate, for example, the sequence in which the build artifacts should be deployed to a device of a computing platform, configuration settings to apply once the build artifacts are deployed, and the like.

The computing platform data model 500, in this example, thus also includes a deployment switch feature entity 520 and a deployment switch parameter entity 522 which are each related to the deployment switch entity 518. As seen in FIG. 5, an instance of the deployment switch entity 518 is related to one or more instances of the deployment switch feature entity 520 and to one or more instances of the deployment switch parameter entity 522. Correspondingly, each instance of the deployment switch feature entity 520 is related to one instance of the deployment switch entity 518, and each instance of the deployment switch parameter entity 522 is related to one instance of the deployment switch entity.

FIGS. 6-11 illustrate various flowcharts of example method steps associated with orchestration pipelines of segmented computing platforms in accordance with aspects of the present disclosure. The steps illustrated in FIGS. 6-11 and described in further detail below are provided by way of example only in order to illustrate the principles associated with executing an orchestration pipeline for a computing platform. It will be appreciated with the benefit of this disclosure that specific implementations may include selectively performing steps similar to those illustrated in FIGS. 6-11. It will also be appreciated with the benefit of this disclosure that specific implementations may include, e.g., performing steps in addition to those illustrated in FIGS. 6-11, performing steps that combine multiple steps respectively illustrated in FIGS. 6-11, omitting one or more of the steps illustrated in FIGS. 6-11, and/or performing steps in sequences that differ from the sequences respectively illustrated in FIGS. 6-11.

Figure 6:
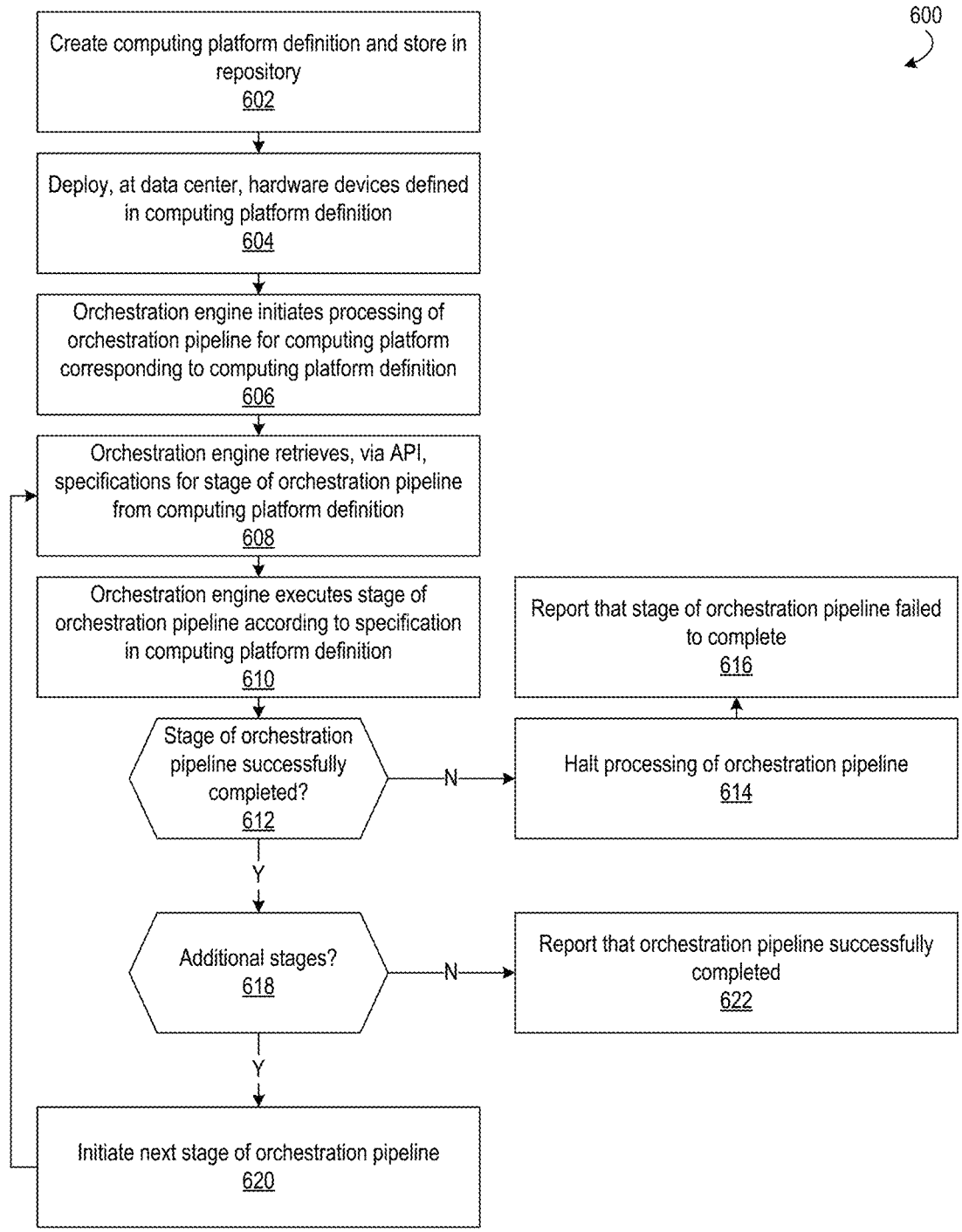
FIG. 6 is a flowchart of example method steps for executing an orchestration pipeline for a computing platform.

In FIG. 6, a flowchart 600 of example methods steps for executing an orchestration pipeline in accordance with aspects of the present disclosure is shown. A computing platform definition is created and stored in a repository (602). Hardware devices defined in the computing platform definition are then deployed at a data center (604). An orchestration engine then initiates processing of an orchestration pipeline for a computing platform corresponding to the computing platform corresponding to the computing platform definition (606). The orchestration engine retrieves from the computing platform definition, via a computing platform API, the specifications of a stage of the orchestration pipeline (608). The orchestration engine executes the stage of the orchestration pipeline according to the specifications retrieved from the computing platform definition (610). The orchestration engine then determines whether the stage of the orchestration pipeline successfully completed (612). If not (612:N), then the orchestration engine halts processing of the orchestration pipeline (614) and reports that the stage of the orchestration pipeline failed to complete successfully (616). If the stage does complete successfully (612:Y), then the orchestration engine may determine whether there are additional stages of the orchestration pipeline remaining to perform (618). If not (618:N), then the orchestration engine reports that the orchestration pipeline completed successfully. If there are additional stages of the orchestration pipeline to perform (618:Y), then the orchestration engine may initiate the next stage of the orchestration pipeline (620) and repeat the steps of obtaining the specifications from the computing platform definition for execution of the next stage (608-610).

Figure 7:
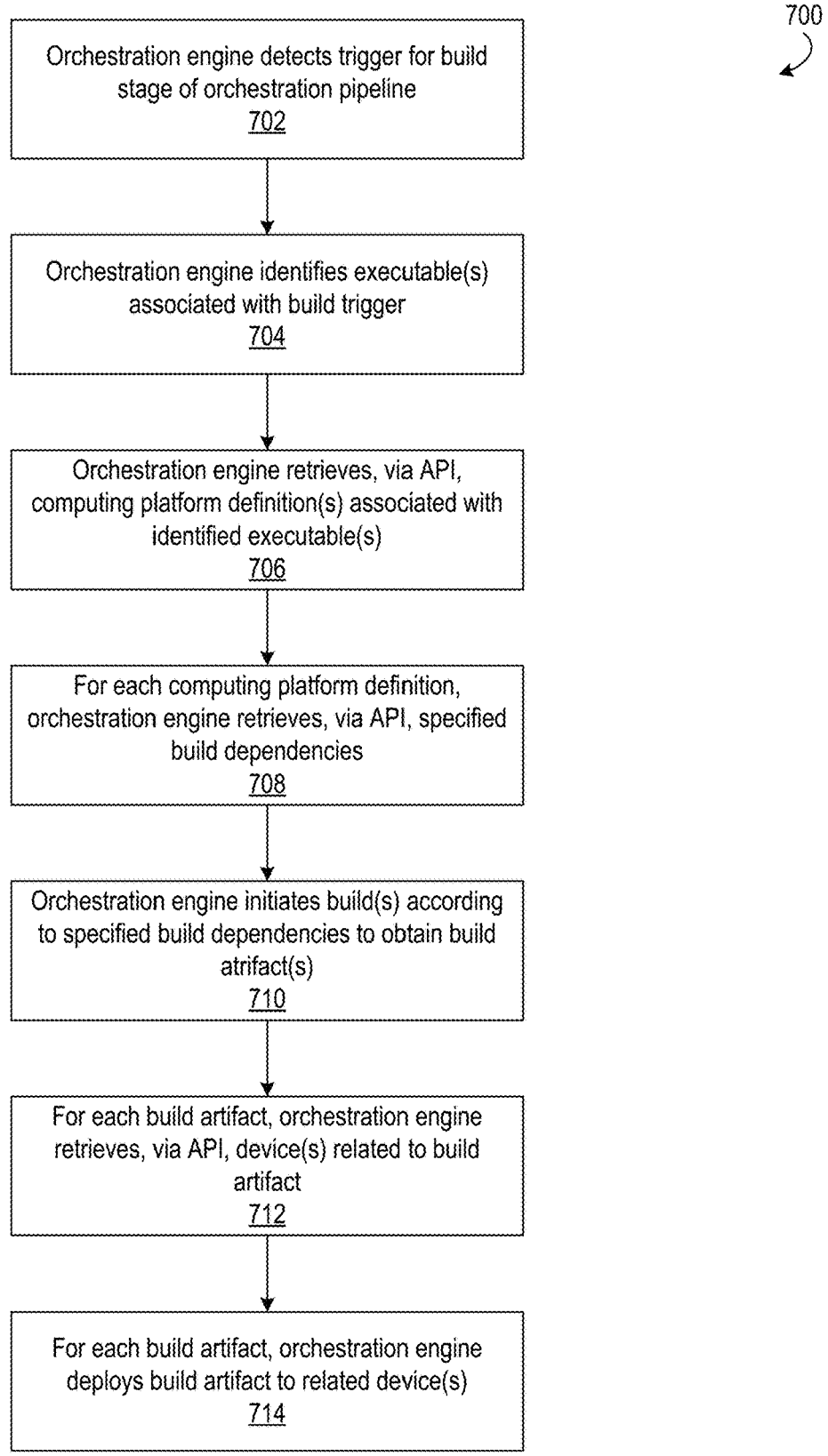
FIG. 7 is a flowchart of example method steps for executing a build stage of an orchestration pipeline.

In FIG. 7, a flowchart 700 of example methods steps for executing a build stage of an orchestration pipeline in accordance with aspects of the present disclosure is shown. An orchestration detects a trigger for the build stage of the orchestration pipeline (702) and identifies one or more executables associated with the build trigger (704). As noted above, an example build trigger may be the commitment of a source code for an executable at a versioning system of a source code repository. The orchestration engine then retrieves, via a computing platform API, one or more computing platform definitions associated with the one or more executables identified (706). For each computing platform definition, the orchestration engine retrieves, via the computing platform API, the build dependencies specified in the computing platform definition (708). The orchestration engine then initiates one or more builds according to the specified build dependencies in order to obtain one or more build artifacts (710). For each build artifact obtained, the orchestration engine retrieves, via the computing platform API, a list of the devices associated with the build artifact (712). The orchestration engine then deploys each build artifact to its related devices (714).

Figure 8:
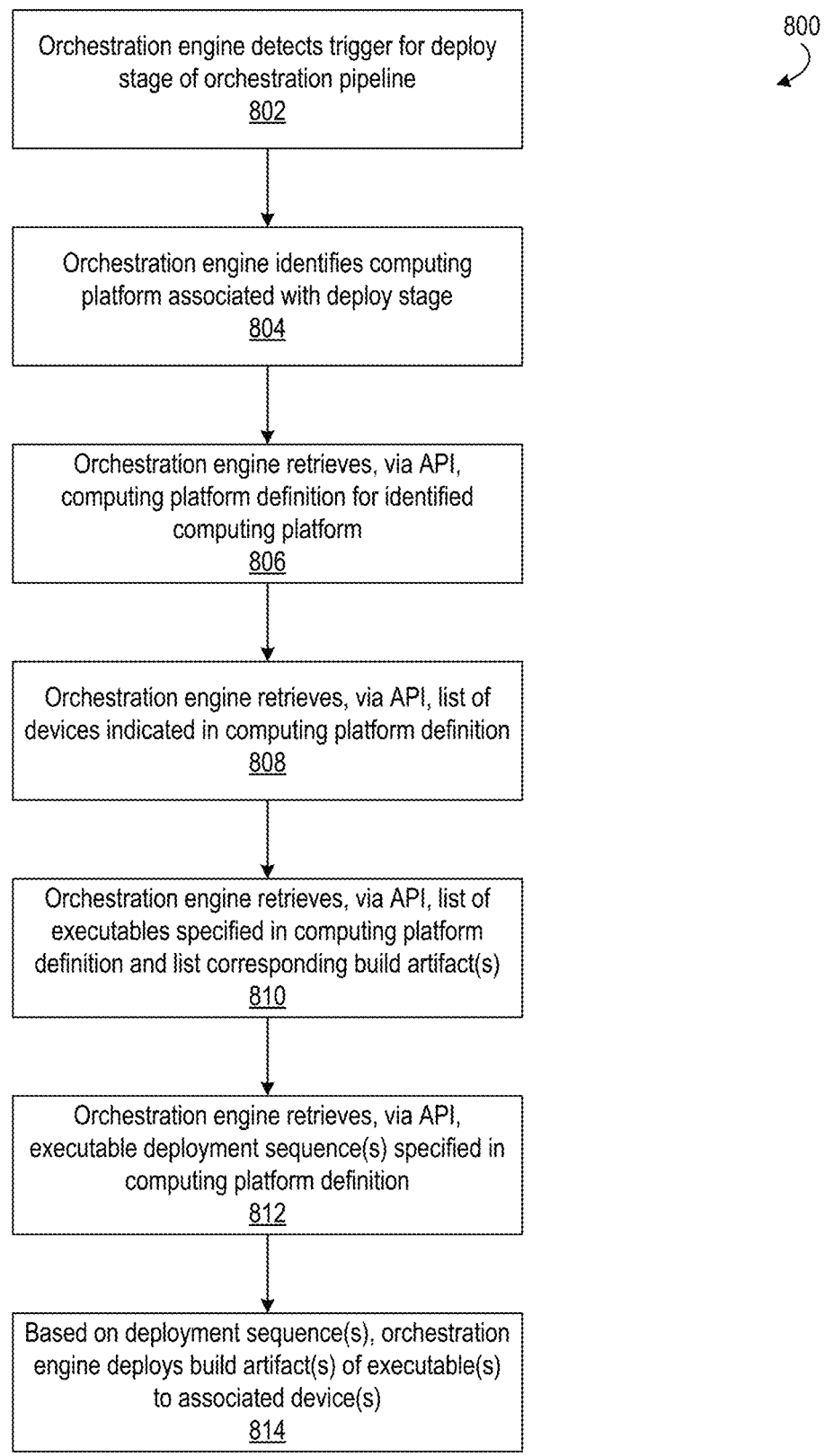
FIG. 8 is a flowchart of example method steps for executing a deployment stage of an orchestration pipeline.

In FIG. 8, a flowchart 800 of example methods steps for executing a deployment stage of an orchestration pipeline in accordance with aspects of the present disclosure is shown. An orchestration engine detects a trigger for the deploy stage of the orchestration pipeline (802) and identifies one or more computing platforms associated with the deploy stage (804). As noted above, an example deploy trigger may be the completion of a build stage for a computing platform. The orchestration engine then retrieves, via a computing platform API, the computing platform definition for the identified computing platform (806). The orchestration engine also retrieves from the computing platform definition, via the computing platform API, a list of the devices of the computing platform (808), a list of the executables of the computing platform and their corresponding build artifacts (810), and one or more deployment sequences for the executables of the computing platform (812). Based on the deployment sequences retrieved, the orchestration engine deploys the build artifacts of the executables to the appropriate devices of each computing platform (814).

Figure 9:
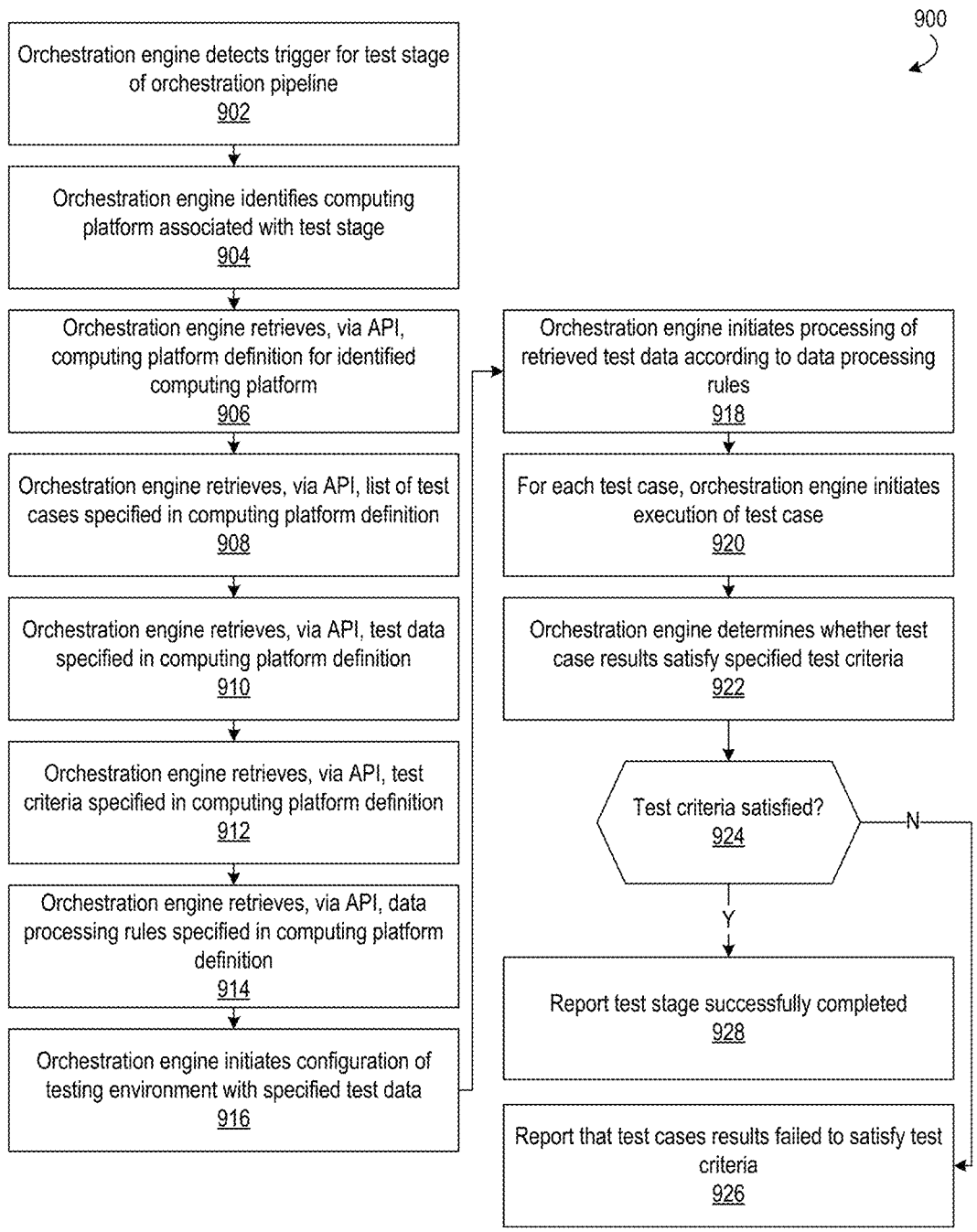
FIG. 9 is a flowchart of example method steps for executing a testing stage of an orchestration pipeline.

In FIG. 9, a flowchart 900 of example methods steps for executing a testing stage of an orchestration pipeline in accordance with aspects of the present disclosure is shown. An orchestration engine detects a trigger for the testing stage of an orchestration pipeline (902) and identifies a computing platform associated with the testing stage (904). As noted above, an example testing trigger may be the completion of a deploy stage of the orchestration pipeline. The orchestration engine retrieves, via a computing platform API, the computing platform definition for the identified computing platform (906). The orchestration engine also retrieves from the computing platform definition, via the computing platform API, a list of the test cases for the computing platform (908), the test data to utilize when executing the test cases (910), and the test criteria to utilize when evaluating the results of the test cases (912). The orchestration engine additionally retrieves from the computing platform definition, via the computing platform API, any data processing rules for the computing platform (914). The orchestration engine then initiates the configuration of a testing environment with the retrieved test data (916) and initiates processing of the retrieved test data according to the retrieved data processing rules (918). For each test case, the orchestration engine initiates execution of the test case at the computing platform in the testing environment (920). It will be appreciated that the orchestration engine may perform the testing stage of the orchestration pipeline for a computing platform implemented in a production environment. In addition, the orchestration engine may invoke or otherwise utilize testing tools that may reside at one or more remote computing devices (e.g., remote computing device 108) to carry out the test cases. Once all test cases have been executed, the orchestration engine determines whether the test case results satisfy the test criteria specified in the computing platform definition (922). If not (924:N), then the orchestration engine reports that the test cases failed to satisfy the test criteria (926). If so (924:Y), then the orchestration engine reports that the testing stage of the orchestration pipeline completed successfully (928).

Figure 10:
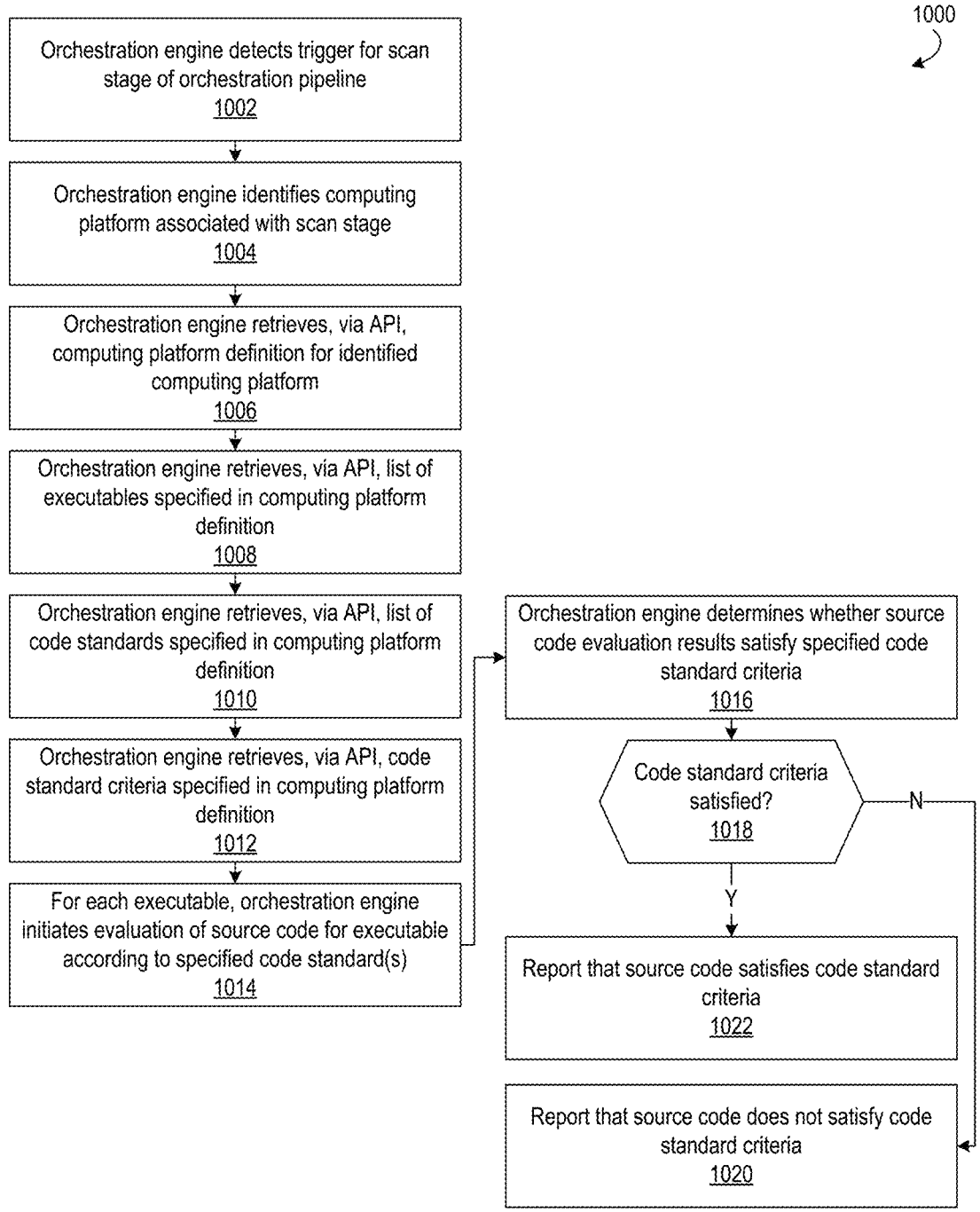
FIG. 10 is a flowchart of example method steps for executing a scanning stage of an orchestration pipeline.

In FIG. 10, a flowchart 1000 of example methods steps for executing a scanning stage of an orchestration pipeline in accordance with aspects of the present disclosure is shown. An orchestration engine detects a trigger for a scanning stage of an orchestration pipeline (1002) and identifies the computing platform associated with the scanning stage (1004). As noted above, an example scanning trigger may be the completion of a testing stage of the orchestration pipeline. The orchestration engine retrieves, via a computing platform API, the computing platform definition for the identified computing platform (1006). The orchestration engine also retrieves from the computing platform definition, via the computing platform API, a list of executables of the computing platform (1008), a list of code standards to apply to the source code of the executables (1010), and the code standard criteria to utilize when evaluating the results of applying the code standards (1012). For each executable, the orchestration engine initiates an evaluation of its source code according to one or more of the retrieved code standards (1014). The orchestration engine may invoke or otherwise utilize code scanning tools that may reside at one or more remote computing devices (e.g., remote computing device 108) to apply the code standards. Once all code standards have been applied, the orchestration engine determines whether the results of the code evaluations satisfy the code standard criteria specified in the computing platform definition (1016). If not (1018:N), then the orchestration engine reports that the source code for the executables of the computing platform does not satisfy the code standards defined for that computing platform (1020). If so, (1018:Y), then the orchestration engine reports that the source code for the executables does satisfy the code standards defined for that computing platform (1022).

Figure 11:
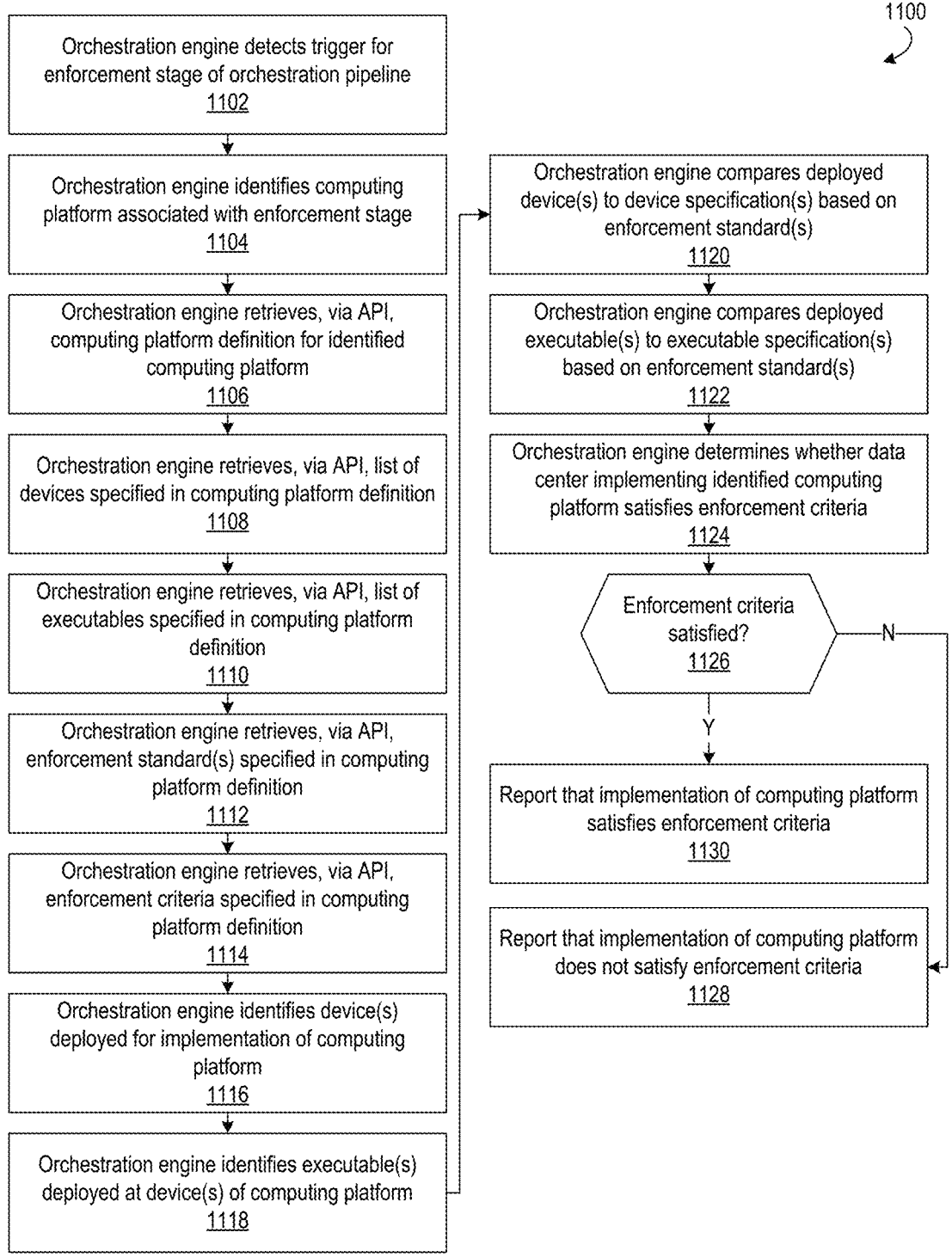
FIG. 11 is a flowchart of example method steps for executing an enforcement stage of an orchestration pipeline.

In FIG. 11, a flowchart 1100 of example methods steps for executing a enforce stage of an orchestration pipeline in accordance with aspects of the present disclosure is shown. An orchestration engine detects a trigger for an enforcement stage of an orchestration pipeline (1102) and identifies the computing platform associated with the enforcement stage (1104). As noted above, an example enforcement trigger may be the receipt of user input at user interface (e.g., orchestration user interface 132) initiating an on-demand evaluation of a computing platform implemented at a data center. The orchestration engine retrieves, via a computing platform API, the computing platform definition for the identified computing platform (1106). The orchestration engine then retrieves from the computing platform definition, via a computing platform API, a list of the devices corresponding computing platforms should include (1108), a list of the executables corresponding computing platforms should include (1110), a list of the enforcement standards to apply when evaluating the implementation of a computing platform (1112), and the enforcement criteria to utilize when evaluating the results of applying the enforcement standards (1114). The orchestration engine then identifies the devices deployed for an implementation of a computing platform (1116) and identifies the executables deployed to those devices of the computing platform (1118). The orchestration engine thus compares, based on one or more of the enforcement standards, the devices actually deployed for the implementation of the computing platform to the list of devices indicated in its corresponding computing platform definition (1120). The orchestration engine also compares, based on one or more of the enforcement standards, the executables actually deployed for the implementation of the computing platform to the list of executables indicated in its corresponding computing platform definition (1122).

As noted above, comparing the implementation of the computing platform to its corresponding computing platform definition may include, for example, determining whether the deployed devices match the devices indicated in the computing platform definition (e.g., number of devices, type of devices, configuration of devices) and determining whether the deployed executables match the executables indicated in the computing platform definition (e.g., number of executables, configuration of executables). Comparing the implementation of the computing platform to its corresponding computing platform definition may also include determining the extent to which an implementation of a computing platform deviates from its corresponding computing platform definition. Deviations may include, for example, devices and/or executables that should be deployed at the computing platform but are not deployed, devices and/or executables that are deployed at the computing platform but are not indicated in its corresponding computing platform definition, a difference between the configuration settings of a devices and/or executable and the corresponding configuration settings indicated in the computing platform definition, and the like. The deviations may be expressed as totals or percentages, e.g., the total number of devices and/or executables that do not match the computing platform definition, the percentage of devices and/or executables that do not match the computing platform definition, and the like.

Once all enforcement standards have been applied, the orchestration engine determines whether the results of the computing platform evaluations satisfy the enforcement standard criteria specified in the computing platform definition (1124). If not (1126:N), then the orchestration engine reports that the implementation of the computing platform does not satisfy the enforcement criteria defined for that computing platform (1128). If so, (1126:Y), then the orchestration engine reports that the implementation of the computing platform does satisfy the enforcement criteria defined for that computing platform (1130).

Figure 12:
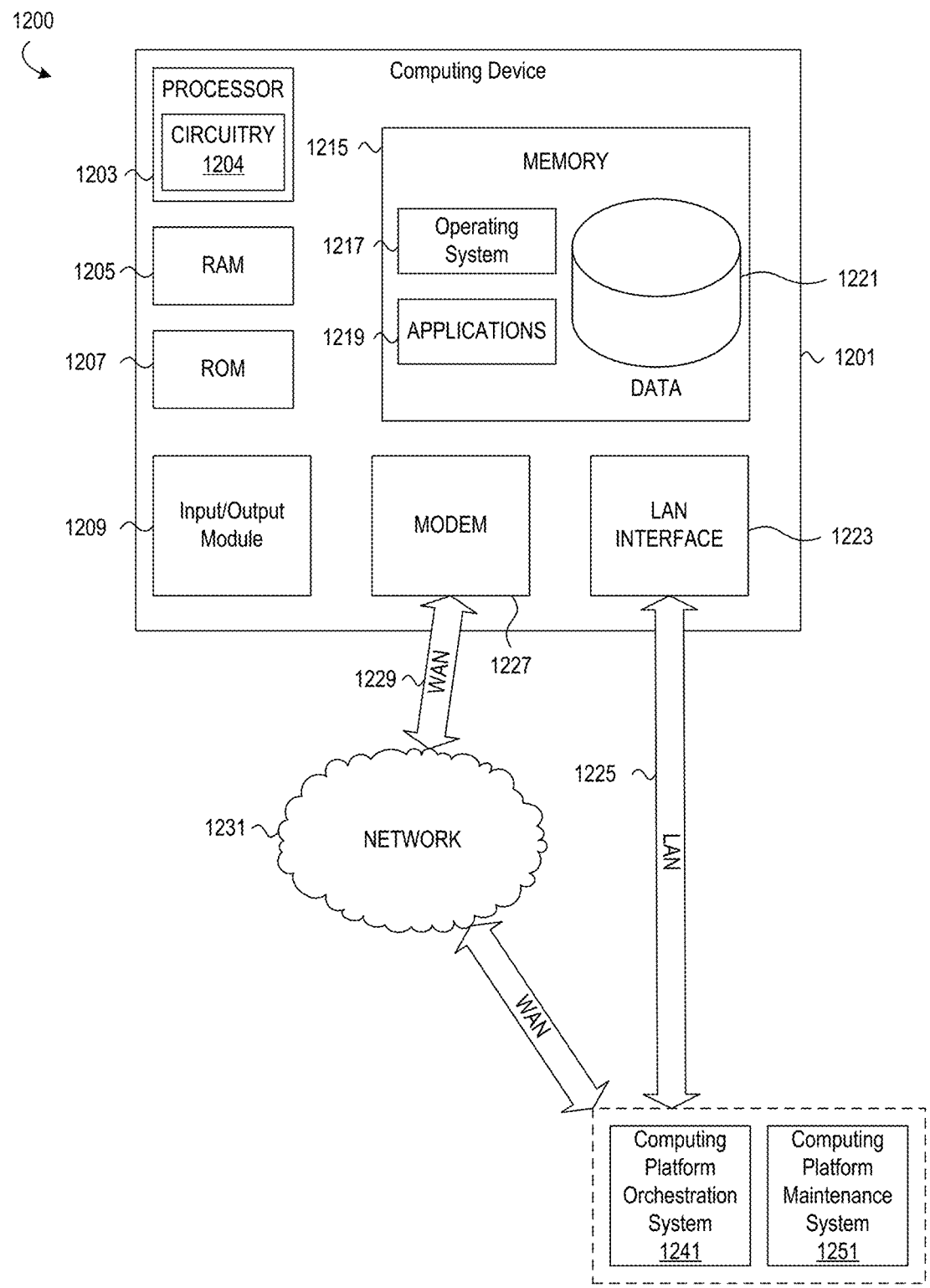
FIG. 12 is a block diagram of various computing components that may be selectively employed to implement aspects of the present disclosure.

In FIG. 12, a block diagram of various computing components that may be selectively employed to implement aspects of the present disclosure is shown. FIG. 12 illustrates a block diagram of an example of an implementation of a computing system 1200 that may be employed in accordance with aspects of this disclosure. The computing system 1200 includes a computing device 1201 having a processor 1203 with circuitry 1204 for controlling overall operation of the computing device its associated components, including RAM 1205, ROM 1207, an input/output (I/O) module 1209, and memory 1215.

I/O module 1209 may include a microphone, keypad, touch screen, and/or stylus through which a user of the computing device 1201 may provide input, and may also include one or more of a speaker for providing audio output and a video display device for providing textual, audiovisual and/or graphical output. Software may be stored within memory 1215 and/or storage to provide instructions to the processor 1203 for enabling the computing device 1201 to perform various functions. For example, memory 1215 may store software used by the computing device 1201, such as an operating system 1217, application programs 1219, and an associated database 1221. The processor 1203 and its associated components may allow the computing device 1201 to run a series of computer-readable instructions to carry out functions associated with creating and managing computing platform definitions and functions associated with executing an orchestration pipeline for an implementation of a computing platform.

The computing device 1201 may operate in a networked environment supporting connections to one or more remote computers and/or systems. The computing device 1201, in this example, is communicatively connected to a computing platform orchestration system 1241 and a computing platform maintenance system 1251. The systems 1241 and 1251 may be the same as, or at least similar to the computing platform orchestration system 104 and the computing platform maintenance system 102 discussed above with reference to FIG. 1. The systems 1241 and 1251 may also include one or more computing devices that include many or all of the elements described above with respect to the computing device 1201.

The network connections depicted in FIG. 12 include a local area network (LAN) 1225 and a wide area network (WAN) 1229, but may also include other networks. When used in a LAN networking environment, the computing device 1201 is connected to the LAN 1225 through a network interface or adapter 1223. When used in a WAN networking environment, the computing device 1201 may include a modem 1227 or other means for establishing communications over the WAN 1229, such as the Internet 1231. It will be appreciated that the network connections shown are illustrative and other means of establishing a communications link between the computers may be used. The existence of any of various well-known protocols such as TCP/IP, Ethernet, FTP, HTTP and the like is presumed.

Additionally, application programs 1219 used by the computing device 1201 include computer-executable instructions for invoking functionality related to creating, implementing, testing, and enforcing computing platform definitions.

The computing device 1201 and/or systems 1241 and 1251 may also include mobile terminals, such as smart phones, personal digital assistants (PDAs), tablet computing devices, and the like, which may include various other components, such as a battery, speaker, and antennas (not shown).

The disclosure may be described in the general context of special-purpose computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Aspects of the disclosure have been described in terms of illustrative embodiments thereof. Numerous other embodiments, implementations, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A system for operating a computing platform comprising:
    one or more processors;
    a data store storing a computing platform definition, the computing platform definition comprising (i) a set of device entries, each device entry indicating a device to deploy to a computing platform and at least one characteristic of the device, and (ii) a set of executable entries, each executable entry indicating an executable to deploy to a device of the computing platform;
    a communication interface communicatively connected to a computing platform that implements the computing platform definition via a set of devices corresponding to the set of device entries and a set of executables corresponding to the set of executable entries; and
    memory storing instructions that, when executed by one of the processors, cause the system to perform, with respect to the computing platform, individual stages of a plurality of stages of an orchestration pipeline, wherein the plurality of stages includes a build stage, a deploy stage, a test stage, a scan stage, and an enforce stage and wherein the plurality of stages are executed in sequence such that completion of one stage triggers execution of a next stage in the sequence, wherein performing a stage of the orchestration pipeline comprises:
detecting a trigger for the stage,
retrieving, from the computing platform definition, one or more entries associated with the stage,
controlling execution of the stage based on the one or more entries retrieved,
observing one or more events during execution of the stage;
identifying, based on observing the one or more events, an action to perform in response to observing the one or more events, the action being based on an event definition,
executing the identified action, and
providing a notification comprising an indication of whether the stage completed successfully.

2. The system of claim 1, wherein:
the build stage generates build artifacts of the set of executable entries;
the computing platform definition further comprises (iii) a set of build dependency entries, each build dependency entry indicating a dependency to build during a build of an executable of the computing platform;
retrieving the one or more entries associated with the build stage comprises retrieving the set of executable entries and the set of build dependency entries; and
controlling executing of the build stage comprises (a) for each executable entry, initiate a build of an executable corresponding to the executable entry, and (b) for each build dependency entry, initiate a build of a dependency corresponding to the build dependency entry.

3. The system of claim 2, wherein:
detecting the trigger for the build stage comprises detecting a commit of source code associated with an executable of the computing platform.

4. The system of claim 1, wherein:
the deploy stage deploys generated build artifacts to the set of devices corresponding to the set of device entries;
the computing platform definition further comprises (iii) a deployment sequence indicating an order in which one or more executables are deployed to the computing platform;
retrieving the one or more entries associated with the deploy stage comprises retrieving the deployment sequence; and
controlling execution of the deploy stage comprises deploying one or more executables of the computing platform to a corresponding device of the computing platform according to the deployment sequence.

5. The system of claim 4, wherein:
detecting the trigger for the deploy stage comprises detecting a successful build of one or more executables of the computing platform.

6. The system of claim 1, wherein:
the test stage executes test cases associated with the computing platform;
the computing platform definition further comprises (iii) a set of test case entries, each test case entry indicating a test case to perform with respect to the computing platform, and (iv) a set of test data entries, each test data entry indicating test data to utilize when performing a test case indicated in the set of test case entries;
retrieving the one or more entries associated with the test stage comprises retrieving the set of test case entries and the set of test data entries; and
controlling executing of the test stage comprises, for each test case entry, initiating, with respect to the computing platform, performance of the test case indicated using corresponding test data indicated in one of the test data entries.

7. The system of claim 6, wherein:
detecting the trigger for the test stage comprises detecting a successful deployment of one or more executables to the computing platform.

8. The system of claim 1, wherein:
the scan stage evaluates source code of the set of executables and applies code standards defined for the computing platform;
the computing platform definition further comprises (iii) a set of code standard entries, each code standard entry identifying a code standard that source code of an executable of the computing platform must satisfy;
retrieving the one or more entries associated with the scan stage comprises retrieving the set of code standard entries; and
controlling execution of the scan stage comprises, for each code standard entry, determining whether source code of one or more executables of the computing platform satisfies the code standard indicated.

9. The system of claim 1, wherein:
the enforce stage evaluates the computing platform to determine an extent to which is conforms to or deviates from the computing platform definition;
the computing platform definition further comprises (iii) a set of enforcement standard entries, each enforcement standard entry identifying a standard the computing platform must satisfy;
retrieving the one or more entries associated with the enforce stage comprises retrieving the set of enforcement standard entries; and
controlling execution of the enforce stage comprises, for each enforcement standard entry, determining whether the computing platform satisfies the enforcement standard indicated.

10. A computer-implemented method for operating a computing platform comprising:
storing, at a data store of a computing device, a computing platform definition, the computing platform definition comprising (i) a set of device entries, each device entry indicating a device to deploy to a computing platform and at least one characteristic of the device, and (ii) a set of executable entries, each executable entry indicating an executable to deploy to a device of the computing platform;
connecting, by the computing device, to a computing platform that implements the computing platform definition via a set of devices corresponding to the set of device entries and a set of executables corresponding to the set of executable entries;
performing, by the computing device with respect to the computing platform, individual stages of a plurality of stages of an orchestration pipeline, the plurality of stages including a build stage, a deploy stage, a test stage, a scan stage, and an enforce stage and wherein the plurality of stages are executed in sequence such that completion of one stage triggers execution of a next stage in the sequence, wherein performing an individual stage of the orchestration pipeline comprises:
detecting a trigger for the stage,
retrieving, from the computing platform definition, one or more entries associated with the stage, controlling execution of the stage based on the one or more entries retrieved, observing one or more events during execution of the stage;

identifying, based on observing the one or more events, an action to perform in response to observing the one or more events, the action being based on an event definition, executing the identified action, and providing a notification comprising an indication of whether the stage completed successfully.

11. The computer-implemented method of claim 10, wherein:

the build stage generates build artifacts of the set of executable entries;

the computing platform definition further comprises (iii) a set of build dependency entries, each build dependency entry indicating a dependency to build during a build of an executable of the computing platform;

retrieving the one or more entries associated with the build stage comprises retrieving the set of executable entries and the set of build dependency entries; and controlling executing of the build stage comprises (a) for each executable entry, initiate a build of an executable corresponding to the executable entry, and (b) for each build dependency entry, initiate a build of a dependency corresponding to the build dependency entry.

12. The computer-implemented method of claim 11, wherein:

detecting the trigger for the build stage comprises detecting a commit of source code associated with an executable of the computing platform.

13. The computer-implemented method of claim 10, wherein:

the deploy stage deploys generated build artifacts to the set of devices corresponding to the set of device entries;

the computing platform definition further comprises (iii) a deployment sequence indicating an order in which one or more executables are deployed to the computing platform;

retrieving the one or more entries associated with the deploy stage comprises retrieving the deployment sequence; and controlling execution of the deploy stage comprises deploying one or more executables of the computing platform to a corresponding device of the computing platform according to the deployment sequence.

14. The computer-implemented method of claim 13, wherein:

detecting the trigger for the deploy stage comprises detecting a successful build of one or more executables of the computing platform.

15. The computer-implemented method of claim 10, wherein:

the test stage executes test cases associated with the computing platform;

the computing platform definition further comprises (iii) a set of test case entries, each test case entry indicating a test case to perform with respect to the computing platform, and (iv) a set of test data entries, each test data entry indicating test data to utilize when performing a test case indicated in the set of test case entries;

retrieving the one or more entries associated with the test stage comprises retrieving the set of test case entries and the set of test data entries; and controlling executing of the test stage comprises, for each test case entry, initiating, with respect to the computing platform, performance of the test case indicated using corresponding test data indicated in one of the test data entries.

16. The computer-implemented method of claim 15, wherein:

detecting the trigger for the test stage comprises detecting a successful deployment of one or more executables to the computing platform.

17. The computer-implemented method of claim 10, wherein:

the scan stage evaluates source code of the set of executables and applies code standards defined for the computing platform;

the computing platform definition further comprises (iii) a set of code standard entries, each code standard entry identifying a code standard that source code of an executable of the computing platform must satisfy;

retrieving the one or more entries associated with the scan stage comprises retrieving the set of code standard entries; and controlling execution of the scan stage comprises, for each code standard entry, determining whether source code of one or more executables of the computing platform satisfies the code standard indicated.

18. The computer-implemented method of claim 10, wherein:

the enforce stage evaluates the computing platform to determine an extent to which is conforms to or deviates from the computing platform definition;

the computing platform definition further comprises (iii) a set of enforcement standard entries, each enforcement standard entry identifying a standard the computing platform must satisfy;

retrieving the one or more entries associated with the enforce stage comprises retrieving the set of enforcement standard entries; and controlling execution of the enforce stage comprises, for each enforcement standard entry, determining whether the computing platform satisfies the enforcement standard indicated.

19. A system for operating a computing platform comprising:

one or more processors;

a data store storing a computing platform definition, the computing platform definition comprising (i) a set of device entries, each device entry indicating a device to deploy to a computing platform and at least one characteristic of the device, and (ii) a set of executable entries, each executable entry indicating an executable to deploy to a device of the computing platform, (iii) a set of build dependency entries, each build dependency entry indicating a dependency to build during a build of an executable of the computing platform, (iv) a deployment sequence indicating an order in which one or more executables are deployed to the computing platform, (v) a set of test case entries, each test case entry indicating a test case to perform with respect to the computing platform, (vi) a set of test data entries, each test data entry indicating test data to utilize when performing a test case indicated in the set of test case entries, (vii) a set of code standard entries, each code standard entry identifying a code standard that source code of an executable of the computing platform must satisfy, (viii) a set of enforcement standard entries, each enforcement standard entry identifying a standard the computing platform must satisfy;

a communication interface communicatively connected to a computing platform that implements the computing platform definition via a set of devices corresponding to the set of device entries and a set of executables corresponding to the set of executable entries; and memory storing instructions that, when executed by one of the processors, cause the system to perform, with respect to the computing platform, individual stages of a plurality of stages of an orchestration pipeline wherein performing a stage of the orchestration pipeline comprises:

detecting a trigger for the stage, retrieving, from the computing platform definition, one or more entries associated with the stage, controlling execution of the stage based on the one or more entries retrieved, observing one or more events during execution of the stage;

identifying, based on observing the one or more events, an action to perform in response to observing the one or more events, the action being based on an event definition, executing the identified action, and providing a notification comprising an indication of whether the stage completed successfully;

wherein the plurality of stages of the orchestration pipeline comprise a build stage that builds the executables of the computing platform, a deploy stage that deploys the executables to the computing platform, a test stage that initiates execution of one or more test cases with respect to the computing platform, an scan stage that applies one or more code standards to source code of the executables of the computing platform, and an enforce stage that determines an extent to which the computing platform deviates from the computing platform definition, and wherein the plurality of stages are executed in sequence such that completion of one stage triggers execution of a next stage in the sequence.

20. The system of claim 19, wherein:

the instructions, when executed by one of the one or more processors, further cause the system to:

automatically initiate the build stage in response to detecting a commit of source code associated with an executable of the computing platform, automatically initiate the deploy stage in response to detecting a successful build of one or more executables of the computing platform, and automatically initiate the test stage in response to detecting successful deployment of one or more executables of the computing platform.

* * * * *

UNITED STATES PATENT AND TRADEMARK OFFICE
CERTIFICATE OF CORRECTION

| | |
|---|---|
| PATENT NO. | : 10,409,622 B2 |
| APPLICATION NO. | : 15/232942 |
| DATED | : September 10, 2019 |
| INVENTOR(S) | : Suresh G. Nair et al. |

It is certified that error appears in the above-identified patent and that said Letters Patent is hereby corrected as shown below:

On the Title Page

Page 2, Column 2, item (56), Other Publications, Line 9:
Delete "Hierachical" and insert --Hierarchical--

Page 2, Column 2, item (56), Other Publications, Line 21:
Delete "Mar. 28, 2016" and insert --Mar. 26, 2018--

In the Claims

Column 28, Line 27:
In Claim 9, delete "is" and insert --it--

Column 30, Line 29:
In Claim 18, delete "is" and insert --it--

Signed and Sealed this
Twenty-fourth Day of November, 2020

Andrei Iancu
*Director of the United States Patent and Trademark Office*